(12) United States Patent
Vigil

(10) Patent No.: US 7,477,705 B2
(45) Date of Patent: Jan. 13, 2009

(54) METHOD FOR DEMODULATING A DIGITAL SIGNAL BASED ON AN ESTIMATE OF MULTIPATH PROPAGATION IMPAIRMENT, AND AN ASSOCIATED RECEIVER

(76) Inventor: Armando J. Vigil, 154 Grace Blvd., Altamonte Springs, FL (US) 32714

( * ) Notice: Subject to any disclaimer, the term of this patent is extended or adjusted under 35 U.S.C. 154(b) by 234 days.

(21) Appl. No.: 11/253,910

(22) Filed: Oct. 19, 2005

(65) Prior Publication Data

US 2006/0088129 A1    Apr. 27, 2006

Related U.S. Application Data

(63) Continuation of application No. 09/866,539, filed on May 25, 2001, now Pat. No. 7,006,581.

(60) Provisional application No. 60/207,028, filed on May 25, 2000.

(51) Int. Cl.
*H03K 9/60* (2006.01)
*H03H 7/30* (2006.01)

(52) U.S. Cl. ................................ 375/316; 375/231

(58) Field of Classification Search ................. 375/316, 375/346–347, 231, 147
See application file for complete search history.

(56) References Cited

U.S. PATENT DOCUMENTS

| | | | |
|---|---|---|---|
| 5,029,186 A | 7/1991 | Maseng et al. ................. 375/94 |
| 5,263,026 A | 11/1993 | Parr et al. ................... 370/95.1 |
| 5,432,821 A | 7/1995 | Polydoros et al. ........... 375/340 |
| 5,471,501 A | 11/1995 | Parr et al. .................... 375/354 |
| 5,592,235 A | 1/1997 | Park et al. ................... 348/555 |
| 5,692,006 A * | 11/1997 | Ross .......................... 375/147 |
| 5,802,241 A | 9/1998 | Oshima ....................... 386/46 |
| 5,805,638 A | 9/1998 | Liew .......................... 375/231 |
| 5,822,340 A | 10/1998 | Stenström et al. ............. 371/43 |
| 5,886,748 A | 3/1999 | Lee ............................ 348/614 |
| 5,909,465 A | 6/1999 | Bottomley et al. .......... 375/227 |
| 5,923,378 A | 7/1999 | Limberg ..................... 348/555 |
| 5,943,372 A | 8/1999 | Gans et al. .................. 375/347 |
| 5,963,599 A | 10/1999 | Curtis et al. ................ 375/341 |
| 6,044,111 A * | 3/2000 | Meyer et al. ................ 375/231 |
| 6,141,393 A | 10/2000 | Thomas et al. ............. 375/347 |
| 6,356,605 B1 | 3/2002 | Hosur et al. ................ 375/347 |
| 7,215,719 B2 * | 5/2007 | Vigil .......................... 375/316 |

* cited by examiner

*Primary Examiner*—Emmanuel Bayard

(57) ABSTRACT

A method for demodulating a received digitally modulated signal subjected to multipath propagation impairment includes estimating the multipath propagation impairment of the received digitally modulated signal using a channel estimator, and estimating at least one symbol of the received digitally modulated signal using a symbol estimator. The at least one estimated symbol is adjusted based upon the estimated multipath propagation impairment to generate an estimate of the at least one symbol as impaired by the multipath propagation. At least one error signal is generated by comparing the estimate of the at least one symbol as impaired by the multipath propagation to the received digitally modulated signal. The at least one error signal is used for estimating remaining symbols to be demodulated and for refining the estimated multipath propagation impairment.

32 Claims, 20 Drawing Sheets

METHOD FOR DEMODULATING A DIGITAL SIGNAL BASED ON AN ESTIMATE OF MULTIPATH PROPAGATION IMPAIRMENT, AND AN ASSOCIATED RECEIVER

RELATED APPLICATION

This application is a continuation of U.S. patent application Ser. No. 09/866,539 filed May 25, 2001 now U.S. Pat. No. 7,006,581 which is based upon prior filed copending provisional application No. 60/207,028 filed May 25, 2000, the entire contents of which are incorporated herein by reference.

FIELD OF THE INVENTION

The present invention relates to the field of digital communications, and more particularly, to demodulation of a serially modulated signal subjected to multipath propagation impairment.

BACKGROUND OF THE INVENTION

A phenomenon in wireless communication systems, such as digital radio or television transmission, is multipath propagation. This type of signal degradation occurs when a broadcast signal takes more than one path from the transmitting antenna to the receiving antenna so that the receiving antenna receives multiple signals. One of these multiple signals may come directly from the transmitting antenna, but several other signals are first reflected from buildings and other obstructions before reaching the receiving antenna, and are thus delayed slightly in phase from one another.

The reception of several versions of the same signal shifted in phase results in a composite signal actually being received at the receiving antenna. Two techniques may be used to deal with the multipath propagation of digitally modulated signals. These two techniques are inverse equalization and maximum likelihood sequence estimation (MLSE) detection.

In inverse equalization, an equalizer is implemented, digitally or otherwise, to reverse the propagation effects of multipath on the transmission waveform prior to detection. The equalizer is trained using blind equalization methods, decision feedback methods or by a transmitted training waveform.

There are two fundamental limitations of inverse equalization. The first is the equalizer length, which is a function of the multipath propagation impairment characteristics, namely echo delay and echo amplitude. Equalizer length is necessarily equal to or greater than, and often many times greater than, the multipath delay spread, depending on the amplitude of the multipath pre-echo and/or post-echo components. The second fundamental limitation of inverse equalization is that of 0 dB echo performance. In cases where the amplitudes of delayed signals are equal or nearly equal, the necessary equalizer is usually either unrealizable or impractical.

In MLSE detection systems, a fundamental limitation is complexity. In cases where the channel path count is large and the delay spread is much greater than the symbol interval, the list of survivors becomes unmanageably large, as does the length of the trellis required to represent each survivor. For example, several MLSE detection systems have been disclosed, such as the ones in Parr et al. (U.S. Pat. No. 5,263,026), Polydoros et al. (U.S. Pat. No. 5,432,821) and Parr et al. (U.S. Pat. No. 5,471,501).

In the Parr et al. '026 patent, a method for MLSE demodulation of a received serially modulated signal is disclosed, wherein multipath propagation impairment characteristics are estimated using a least mean square (LMS) algorithm. Rather than converging on an inverse of the multipath propagation impairment, the LMS algorithm converges on an estimate of the multipath propagation impairment. This channel estimate is integrally incorporated into the MLSE algorithm used to determine the symbols making up the serially modulated signal.

In the Polydoros et al. '821 patent, multipath propagation characteristics are incorporated into the survivor selection process used to accomplish data sequence selection. The survivor selection process is likewise based upon MLSE detection. Also in the Parr et al. '501 patent, MLSE detection is performed using an estimation of the multipath propagation impairment. As discussed above, the MLSE demodulation approach is limited by complexity.

A high definition digital television (HDTV) signal is also susceptible to multipath propagation impairment. The HDTV signal is a serially modulated signal based upon the standard set by the Advanced Television System Committee (ATSC) for terrestrial broadcast television in the United States. The ATSC digital television standard was determined by the Grand Alliance and was subsequently accepted by the broadcast community, the consumer electronics industry and the regulatory infrastructure.

The regulatory infrastructure has mandated a strictly scheduled transition of terrestrial broadcast television in the United States from the National Television System Committee (NTSC) or "analog" standard to the ATSC or "digital" standard. A significant investment is in place on behalf of the broadcast industry to support this planned transition. Similarly, many consumers have purchased ATSC television receiver equipment that include new ATSC system complaint DTV television sets and DTV television set-top converters.

However, the ATSC standard, in its present form, is deficient in its susceptibility to multipath propagation impairment. In side-by-side comparisons, ATSC reception, i.e., the new digital system, is often inferior to NTSC reception, i.e., the conventional analog system. Additionally, ATSC mobile reception suffers substantially more degradation due to multipath propagation impairment than NTSC mobile reception. Signal strength and signal-to-noise (SNR) ratios are typically not an issue, as unanticipated inferior reception manifests itself at high levels of received signal power and at high receiver SNR ratios. This fact, coupled with spectral analysis of received ATSC DTV signals, points directly to multipath propagation impairment as the cause of the inferior reception.

Various efforts have been made in the area of DTV reception. For example, Park et al. (U.S. Pat. No. 5,592,235) discloses combining reception, appropriate to terrestrial broadcast and to cable broadcast, both in a single receiver. Also included in these various efforts is Oshima (U.S. Pat. No. 5,802,241), which discloses a plurality of modulation components modulated by a plurality of signal components. Both of these references disclose the use of equalization. As discussed above, complexity of an equalizer is a fundamental limitation.

With respect to enabling the initial acquisition of digitally modulated signals that are severely distorted by multipath propagation impairment, decision-feedback equalizers (DFE) are not suitable. For this purpose, a reference or training waveform is typically introduced. The use of a reference sequence equalizer for equalizing GA-HDTV signals is disclosed in Lee (U.S. Pat. No. 5,886,748). Unfortunately, the Lee '748 patent does not overcome the limitations associated with inverse channel equalizers.

SUMMARY OF THE INVENTION

In view of the foregoing background, it is therefore an object of the present invention to provide a method for demodulating a received digitally modulated signal that is subjected to multipath propagation impairment, particularly when multiple signals of the received signal defining the multipath propagation impairment are substantially equal to one another.

Another object of the present invention is to provide a corresponding digital receiver that is relatively straightforward to implement for demodulating the received digitally modulated signal.

These and other objects, advantages and features in accordance with the present invention are provided by a method for demodulating a received digitally modulated signal subjected to multipath propagation impairment. The method preferably comprises estimating the multipath propagation impairment of the received digitally modulated signal using a channel estimator, and estimating at least one symbol of the received digitally modulated signal using a symbol estimator.

The method preferably further includes adjusting the at least one estimated symbol based upon the estimated multipath propagation impairment to generate an estimate of the at least one symbol as impaired by the multipath propagation, and at least one error signal is generated by comparing the estimate of the at least one symbol as impaired by the multipath propagation to the received digitally modulated signal. The at least one error signal is then preferably used for estimating remaining symbols to be demodulated.

The method preferably further comprises using the at least one error signal for refining the estimated multipath propagation impairment. Next, the method also preferably further comprises estimating at least one next symbol, and adjusting the estimate of the at least one next symbol based upon the refined estimated multipath propagation impairment for generating an estimate of the at least one next symbol as impaired by the multipath propagation.

The at least one error signal is preferably refined by comparing the estimate of the at least one next symbol as impaired by the multipath propagation to the received digitally modulated signal. Refining the at least one error signal preferably further comprises comparing the estimate of the at least one next symbol as impaired by the multipath propagation to the at least one error signal resulting from at least one previous comparison.

Estimating the multipath propagation impairment may be based upon an adaptive algorithm, or based upon a training waveform embedded in the received digitally modulated signal. Similarly, estimating the at least one symbol may be based upon an adaptive algorithm, or based upon the training waveform embedded in the received digitally modulated signal. With respect to the adaptive algorithms, each algorithm may comprise a respective least mean square (LMS) algorithm that has applied thereto a convergence coefficient. The convergence coefficient is preferably based upon the received digitally modulated signal.

After the at least one symbol has been estimated, the remaining symbols to be demodulated are preferably estimated based upon linear estimation. This is performed based upon the at least one error signal. In other words, linear estimation of the remaining symbols or adaptive estimation of the remaining symbols allows the received digitally modulated signal to be demodulated when impaired by multichannel propagation, particularly when multiple signals of the received signal defining the multipath propagation impairment are substantially equal to one another.

Since possible combinations of the symbols to be demodulated are preferably not estimated, as is typically the case for a MLSE equalizer, the complexity of a digital receiver demodulating the received digital signal is minimized. Consequently, performing an adaptive estimation or a linear estimation for the symbols to be demodulated overcomes the limitations applicable to inverse equalization and MLSE estimation, as discussed in the background section.

The received digitally modulated signal preferably comprises at least one of a digital broadcast television signal, a digital broadcast radio signal, a digital cellular telephone signal, and a digital wireless local area network (LAN) signal. Of course, the method according to the present invention may also be applied to other radio systems and to communication through various types of media. In addition, the received digitally modulated signal may be a digitally serial modulated signal.

Another aspect of the invention is directed to a method for simultaneously demodulating a plurality of received digitally modulated signals subjected to multipath propagation impairments. The method preferably comprises estimating the multipath propagation impairments of the plurality of received digitally modulated signals using a plurality of channel estimators, and estimating at least one symbol of each of the plurality of received digitally modulated signals using a plurality of symbol estimators.

Each estimated symbol is preferably adjusted based upon the corresponding estimated multipath propagation impairment to generate an estimate of each symbol as impaired by the corresponding multipath propagation, and at least one error signal is preferably generated by comparing a summation of the estimates of the symbols as impaired by the corresponding multipath propagation to the plurality of received digitally modulated signals. The at least one error signal is preferably used for estimating remaining symbols of each of the plurality of received digitally modulated signals to be demodulated.

Another aspect of the present invention is directed to a receiver for demodulating a received digitally modulated signal subjected to multipath propagation impairment. The digital receiver preferably comprises a channel estimator for estimating the multipath propagation impairment of the received digitally modulated signal, and a symbol estimator connected to the channel estimator for estimating at least one symbol of the received digitally modulated signal.

The channel estimator preferably adjusts the at least one estimated symbol based upon the estimated multipath propagation impairment to generate an estimate of the at least one symbol as impaired by the multipath propagation. The digital receiver may further comprise a summing network connected to the channel estimator and to the symbol estimator for generating at least one error signal by comparing the estimate of the at least one symbol as impaired by the multipath propagation to the received digitally modulated signal. The symbol estimator preferably uses the at least one error signal for estimating the remaining symbols to be demodulated.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime and multiple prime notations are used in alternate embodiments. The dimensions of layers and regions may be exaggerated in the figures for greater clarity.

Figure 1:
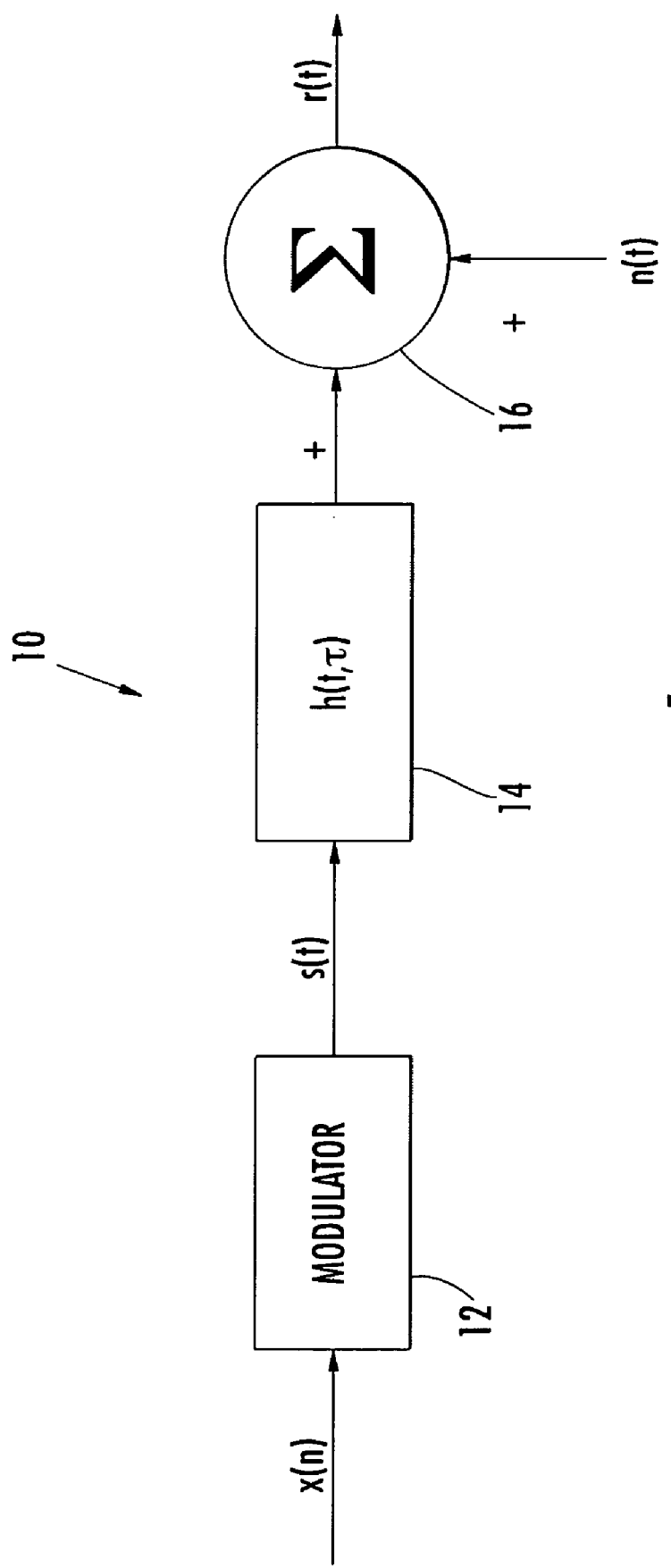
FIG. 1 is a simplified block diagram of a digital transmitter including a continuous-time modulator and a channel model in accordance with the prior art.

Referring initially to FIGS. 1-10, a digital transmitter and a digital receiver of the prior art will be discussed, including the impact of multipath propagation on a digitally modulated signal. A simplified block diagram of a digital transmitter 10 including a continuous-time modulator 12 and a channel modeler 14 is illustrated in FIG. 1.

In the digital transmitter and channel model 10, x(n) represents the data sequence applied to a modulator 12, which generates a modulated waveform s(t) represented in real time. The modulated waveform is broadcast through a propagation channel 14 having a time response $h(t,\tau)$ in a convolutional continuous-time domain $\tau$ that varies continuously over time t. Noise n(t) is added via a summing network 16 for generating the resulting waveform, which is represented by the waveform r(t).

Figure 2:
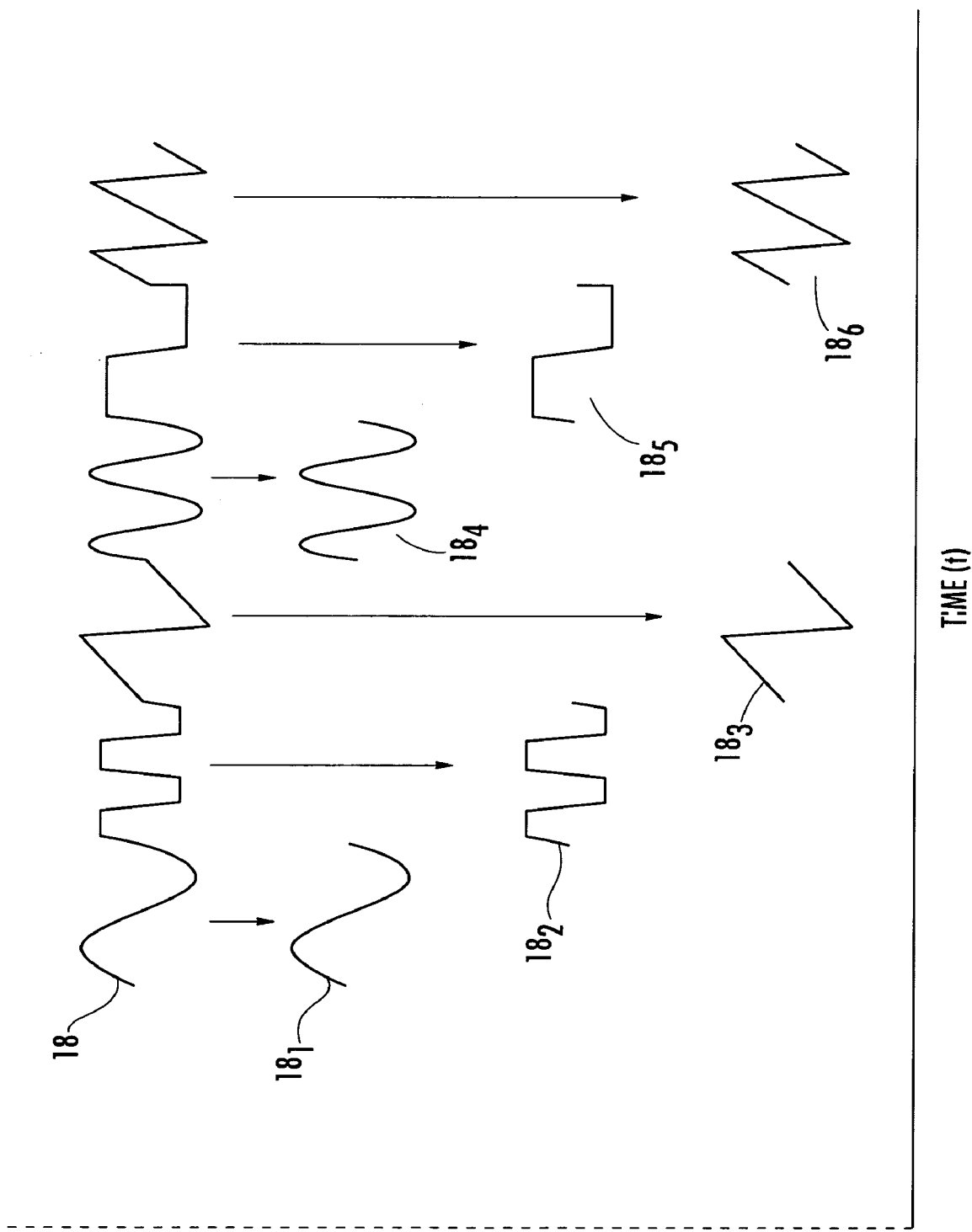
FIG. 2 is an illustration of a segment of a digitally modulated waveform comprising a plurality of symbols in accordance with the prior art.

Referring now to FIG. 2, a modulated waveform 18, for example, comprises a series of different modulation symbols or symbols $18_1$-$18_6$. The modulation symbols $18_1$-$18_6$ may also be referred to simply as symbols. Each symbol is selected from an ensemble of unique shapes, i.e., of varying amplitudes and phases. Each unique shape represents a digital state or group of digital information bits.

These symbols $18_1$-$18_6$ are transmitted serially, i.e., one right after the other. Digital serial modulation is contrasted with Orthogonal Frequency Division Multiplexing (OFDM/COFDM) in that serial modulation carries information serially while OFDM/COFDM carries information both serially and across the modulation spectrum. Although OFDM/COFDM can offer multipath propagation advantages, digital serial modulation is superior in that it is simpler and does not suffer from distortion due to extreme ratios of peak-to-average power.

Figure 3:
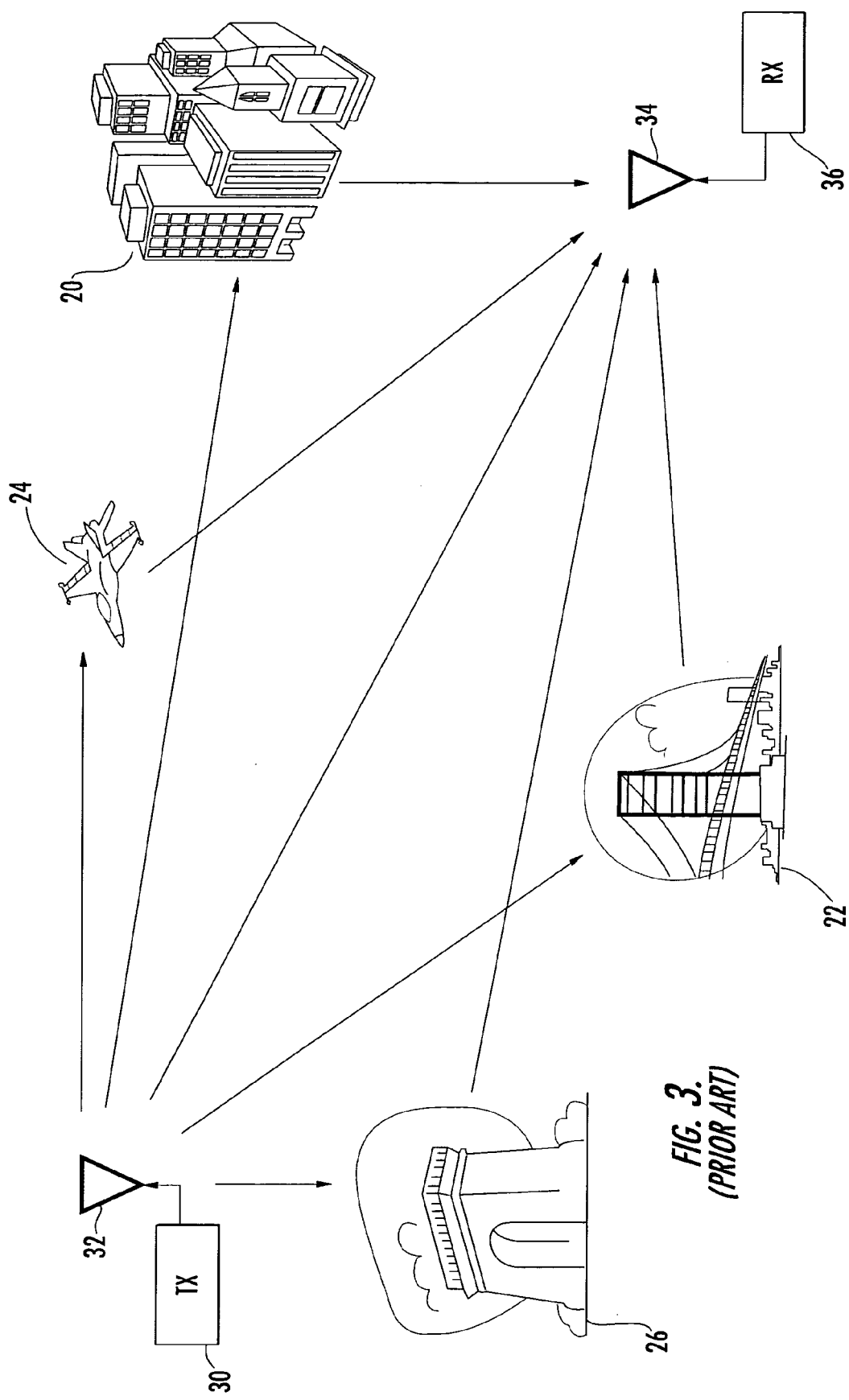
FIG. 3 is an illustration of various physical objects providing propagation paths for a transmitted signal in accordance with the prior art.

In an ideal world, digital transmission passes through a medium, such as air or space, in a straight line and unimpaired. As illustrated in FIG. 3, a transmitter 30 transmits a signal via transmit antenna 32 to receive antenna 34, which is connected to a receiver 36. Realistically, however, the transmitted signal is subjected to obstacles. The transmitted signal is reflected from objects such as buildings 20, bridges 22, aircraft 24, and other man-made and natural structures or obstacles 26. Consequently, the transmitted signal arrives at the receiver 36 after having passed through any number of multiple paths, such as any one of the five paths illustrated in FIG. 3.

Figure 4:
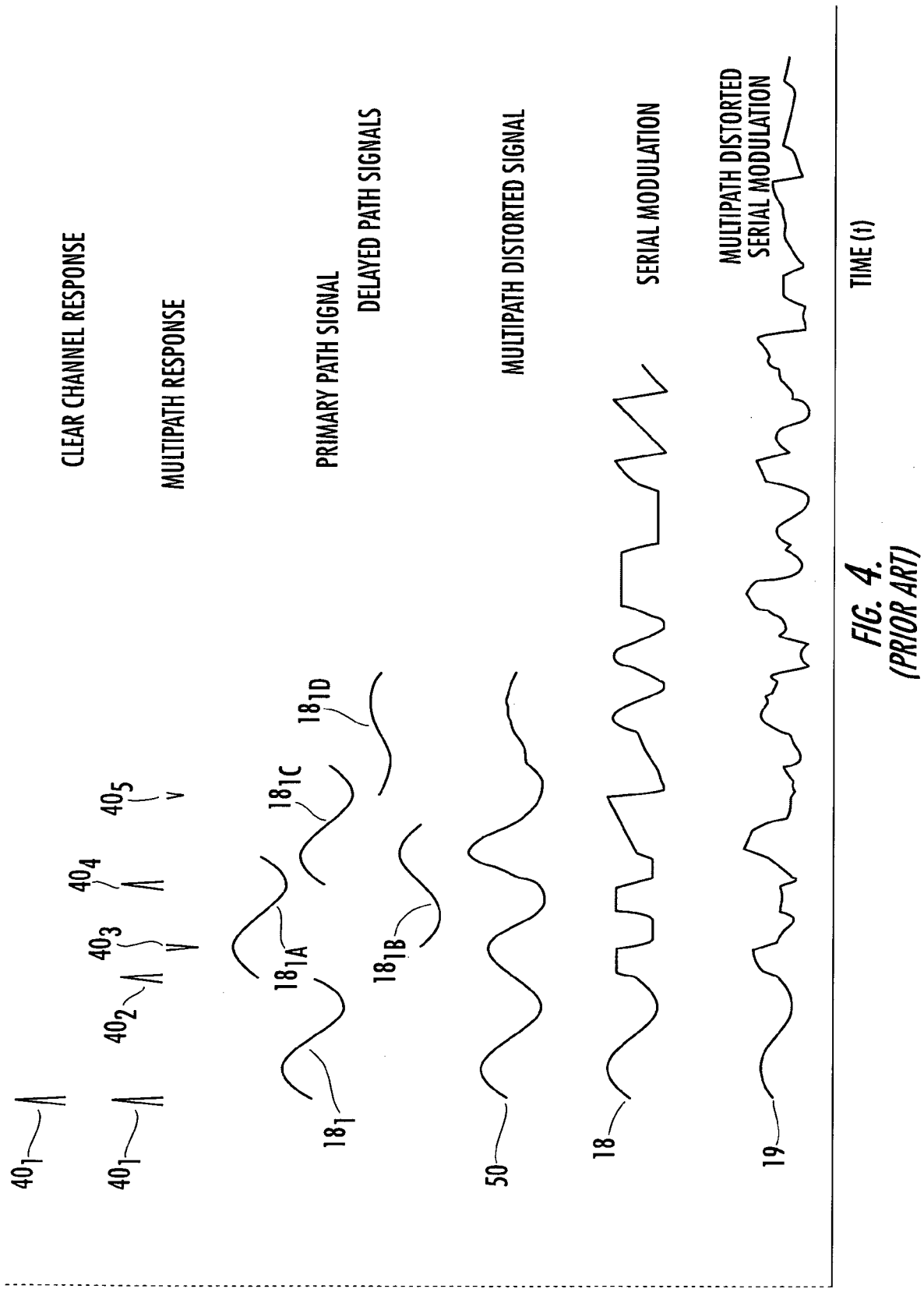
FIG. 4 is an illustration of a five-signal multipath model being applied to a digitally modulated signal in accordance with the prior art.
Figure 5:
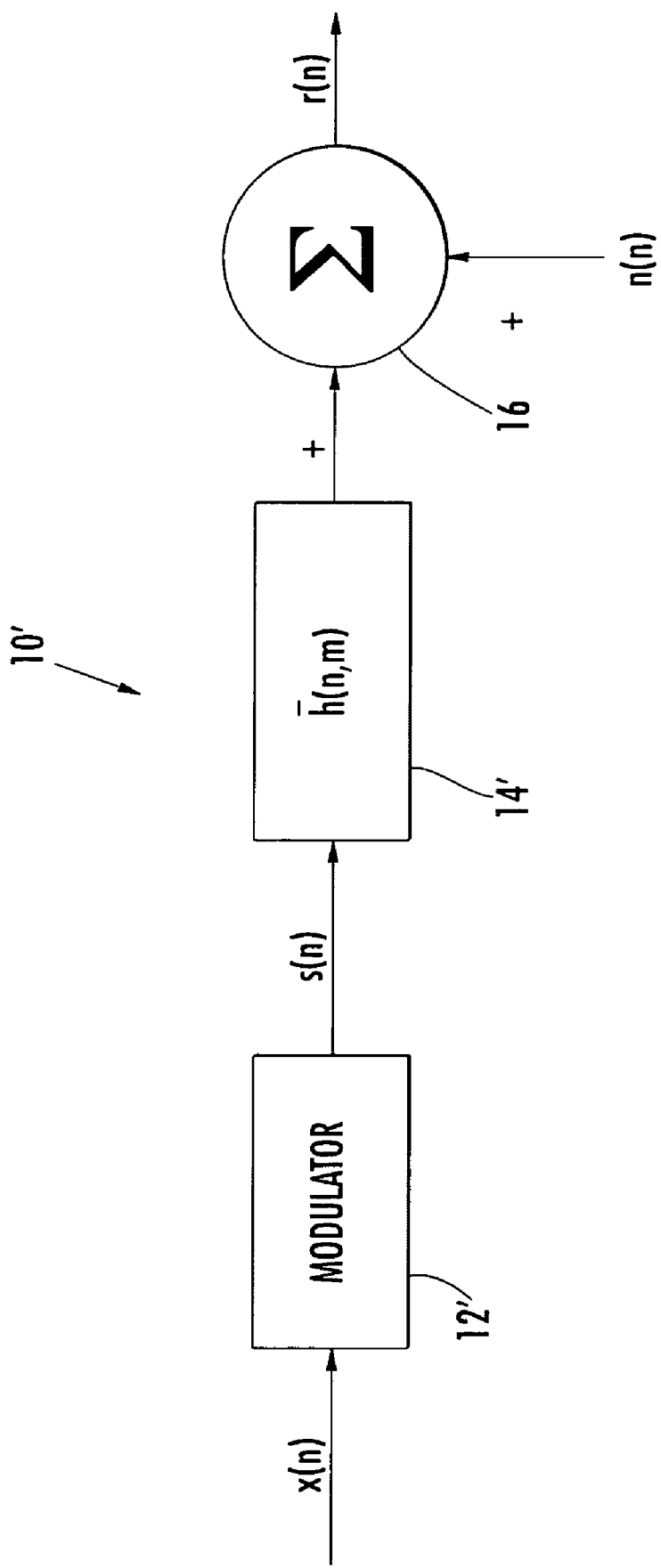
FIG. 5 is a simplified block diagram of a digital transmitter including a time-sampled modulator and a channel model in accordance with the prior art.

For a clear path, a clear channel response may be represented as a single signal component $40_1$, as illustrated in FIG. 4. The single signal component $40_1$ indicates a single time of arrival (TOA), with time progressing from left to right. A multipath response is indicated by multiple signal components $40_1$-$40_5$, with each signal component indicating a different arrival time, a different amplitude and a different phase which may be either positive or negative. In the illustrated example, there are five paths in the transmission medium at some instant in time. Each signal component corresponds to one of these paths.

Assuming that a single symbol $18_1$ from the received signal travels across a single path, then it is received at a single arrival time as part of signal component $40_1$. This arrival time corresponds to a single delay and at the amplitude and phase associated with the first single path. However, in a multipath situation, the second path contributes a component $18_{1A}$ to the received signal (i.e., there is another symbol $18_1$ provided by multipath signal component $40_2$) at a second delay with a second associated amplitude and phase. Likewise the third path contributes a component $18_{1B}$ to the received signal (i.e., there is another symbol $18_1$ provided by multipath signal component $40_3$), this time with a negative phase. Similarly, the fourth and fifth paths each contribute a component $18_{1C}$, $18_{1D}$ to the received signal (i.e., there are two more symbols $18_1$ provided by multipath signal components $40_4$ and $40_5$).

What the receiver 36 sees is the sum of these five multipath components, as represented by signal 50, which is distorted compared to the original transmitted symbol $18_1$. The assumption is now made that an entire digital serial modulation waveform is transmitted 18 to include six consecutive symbols $18_1$-$18_6$. In this case, the received signal 19 is distorted by the presence of five separate paths in such a way as to cause the signal 18 to interfere with itself. The received signal 19 is unrecognizable in this case due to the impairment by the multipath propagation.

When the receiver and demodulation techniques are implemented digitally, digital equalization and multipath analysis lend themselves to sampled-time digital modeling and analysis. As such, the digital transmitter and channel estimate 10' illustrated in FIG. 5 includes a modulator 12' and a channel modeler 14', which are represented in sampled-time as compared to continuous-time shown in FIG. 1. In this illustration, continuous-time t is replaced by time-sampling index n and the continuous convolutional-time domain τ is replaced by the time-sampling convolutional index m.

This model allows for complex (real and imaginary) signal representation and for time sampling intervals which may be integer fractions of the symbol interval. In this model, the same transmission data sequence x(n) as that in FIG. 1 is applied to a time-sampling digital modulator 12' yielding the time-sampled modulated waveform s(n). The time-sampled digitally modulated waveform s(n) is applied to the time-sampled channel model $\bar{h}$(n,m) 14', which is made up of a sequence of time-sampled impulse responses in index m, one per time index n.

Time-sampled noise n(n) is added via a summing network 16 to the output of the time-sampled channel or multipath model process $\bar{h}$(n,m) to yield a time-sampled representation of the received modulated waveform r(n), again in time index n. Successful demodulation requires sufficient consideration of channel distortion $\bar{h}$(n,m) in the process of estimating the modulation data sequence x(n).

Figure 6:
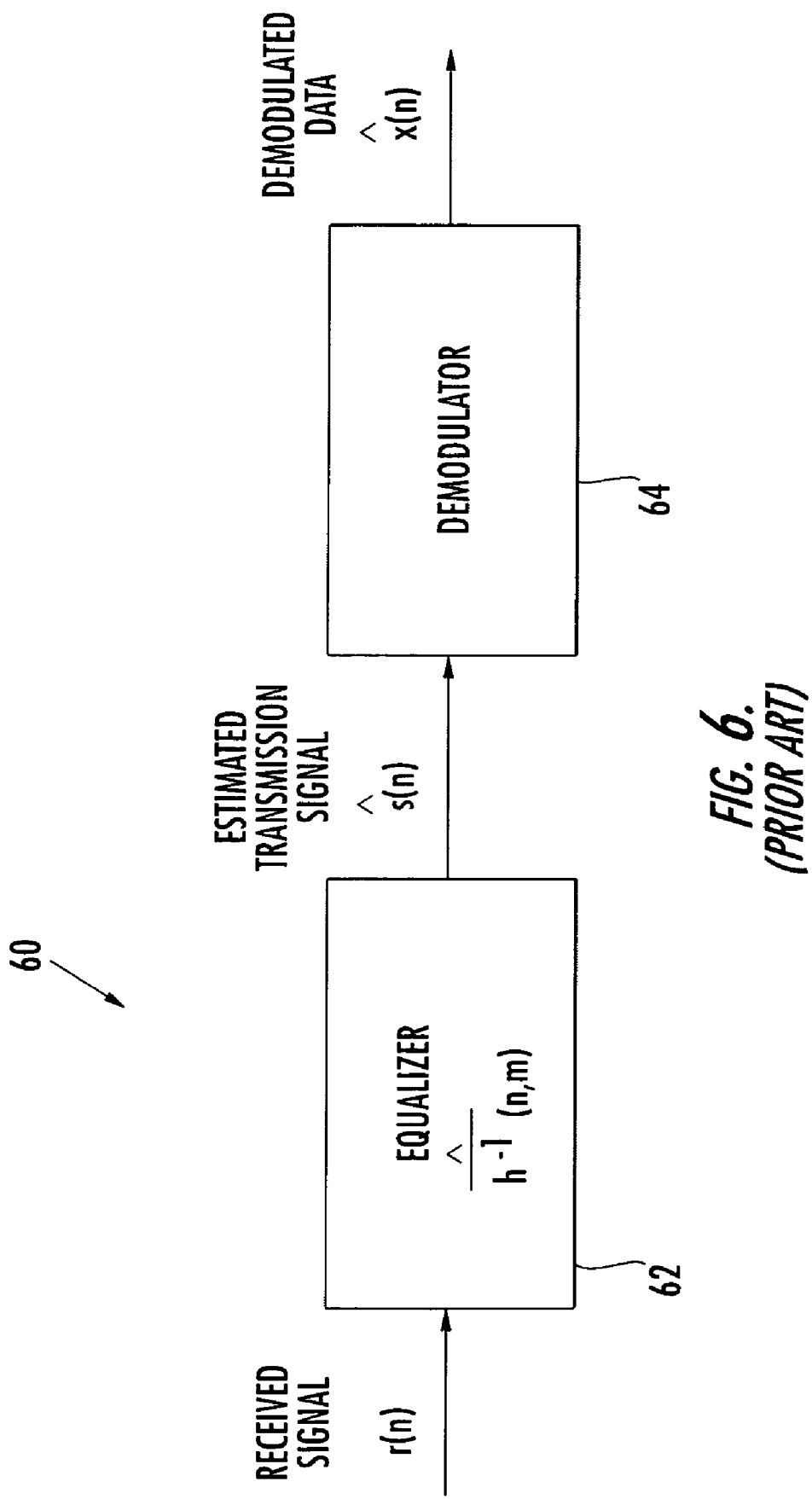
FIG. 6 is a block diagram on the architecture of a digital receiver based upon equalization in accordance with the prior art.
Figure 7:
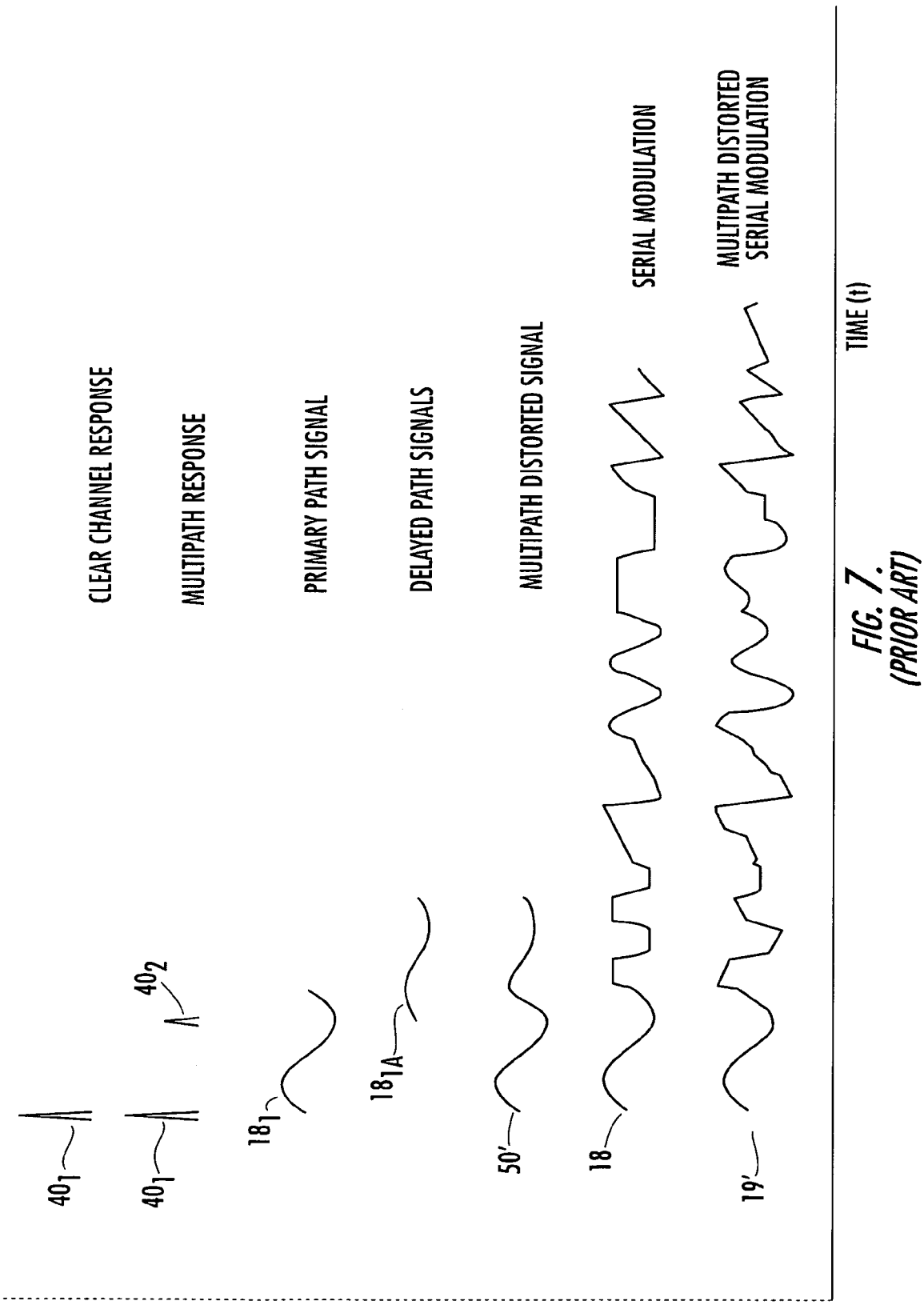
FIG. 7 is an illustration of a two-signal multipath model having a benign multipath being applied to a digitally modulated signal in accordance with the prior art.

Referring now to FIG. 6, an equalization process or method for a digital receiver 60' will be discussed. An equalizer 62 is connected to a demodulator 64. An approximation $\overline{\hat{h}^{-1}}(n,m)$ to the inverse $\overline{h^{-1}}(n,m)$ of the channel response $\bar{h}$(n,m) is applied to the received waveform r(n). The resulting output ŝ(n) is an estimate of the original modulation waveform s(n). The demodulator 64 operates on the modulation waveform estimate ŝ(n) to produce an estimate x̂(n) of the modulation data sequence x(n).

Provided that the channel-inverse equalization response $\overline{h^{-1}}(n,m)$ exists and can be approximated sufficiently as $\overline{\hat{h}^{-1}}(n,m)$ within practical implementation limitations, such as finite impulse response (FIR) filter duration and resolution, the output x̂(n) of the demodulator 64 will be a sufficiently accurate reproduction of the modulation data sequence x(n). However, equalizer length, equalizer tap resolution and the existence and/or practical implementation of the inverse channel response are factors that effect the practical implementation of the equalization process.

The operation and consequent limitations of conventional equalizer techniques will now be described with an example. A straightforward example of digital equalization based on a two-signal multipath channel is illustrated with reference to FIG. 7. Again, one starts with a clear path which exhibits the clear channel response. The single signal component $40_1$ indicates the first single TOA, again with time progressing from left to right.

In the two-signal multipath response, each signal indicates a different arrival time with a different amplitude and phase. Here we show two signal components $40_1$ and $40_2$, with each signal component corresponding to one of two propagation paths in this example. Assuming a single symbol $18_1$ travels across a single path, it is received at a single arrival time corresponding to a single delay and at the amplitude and phase associated with the first single path $40_1$.

In a two-signal multipath situation, the second path contributes a second component $18_{1A}$ to the received signal (i.e., there is another symbol $18_1$ provided by multipath signal component $40_2$) at the second delay with a second associated amplitude and phase. What the receiver 36 sees is the sum (signal 50') of these two multipath components which is distorted compared to the original transmitted symbol.

An assumption is now made that an entire digital serial modulation waveform 18 is transmitted to include the six consecutive symbols $18_1$-$18_6$. In this case, the received signal 19' is distorted by the presence of two distinct paths in such a way as to cause the signal to interfere with itself. The received signal 19' is severely distorted when compared to the original modulated signal 18.

Currently, receivers compensate for this multipath propagation impairment, i.e., distortion, using equalization techniques. Considering the same transmitted serial modulated waveform 18, along with the same two-signal multipath response example as discussed above with reference to FIG. 7, the received signal 19' as shown earlier is again shown with reference to FIG. 8.

Equalization, as readily understood by one skilled in the art, employs a finite impulse filter (FIR) 62 for the received signal 19', which is assumed to have a dominant primary path component $40_1$. This filter (or equalizer) 62 operates on the principle of adding delayed versions of the received signal so as to cancel non-primary paths of lesser strength.

Figure 8:
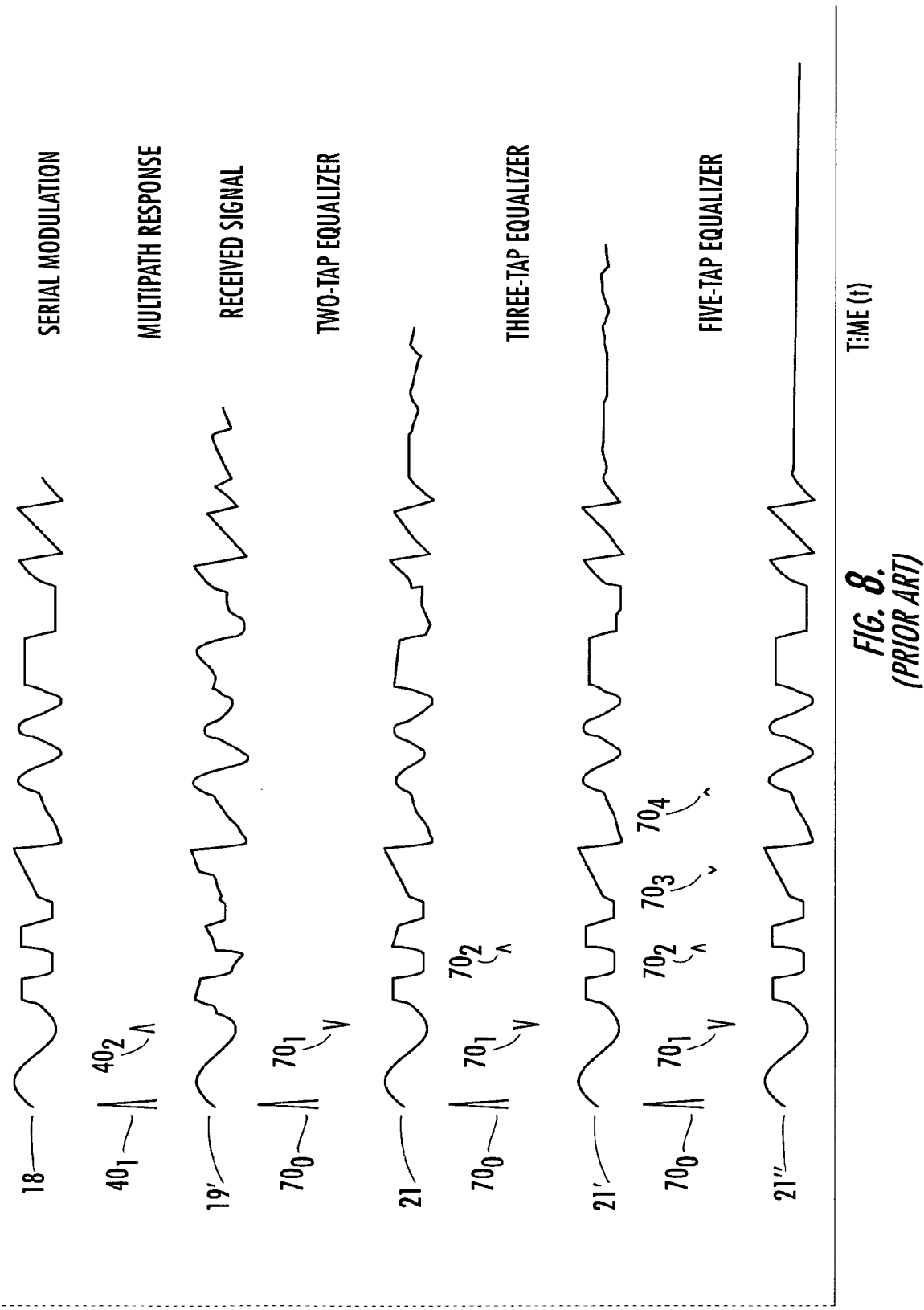
FIG. 8 is an illustration of the successful equalization of a received signal impaired by a moderate two-signal multipath model in accordance with the prior art.

In the example illustrated in FIG. 8, the equalizer begins by introducing a delayed component $70_1$ to the primary received signal component $70_0$. The delayed signal component $70_1$ is designed to cancel the secondary multipath component $40_2$, which is smaller in amplitude with respect to the primary multipath component $40_1$. The result is a signal 21 with most of the multipath distortion cancelled.

However, there is still some residual distortion at twice the echo delay. So the equalizer is adjusted by adding a tap $70_2$, this time to cancel the compound echo at twice the path delay. The result is a much cleaner signal, as illustrated by signal 21'. This may be repeated with two more taps $70_{3-4}$ to produce an even cleaner signal 21". The resulting equalized waveform 21" is very clean, almost indistinguishable from the modulated waveform 18.

Figure 9:
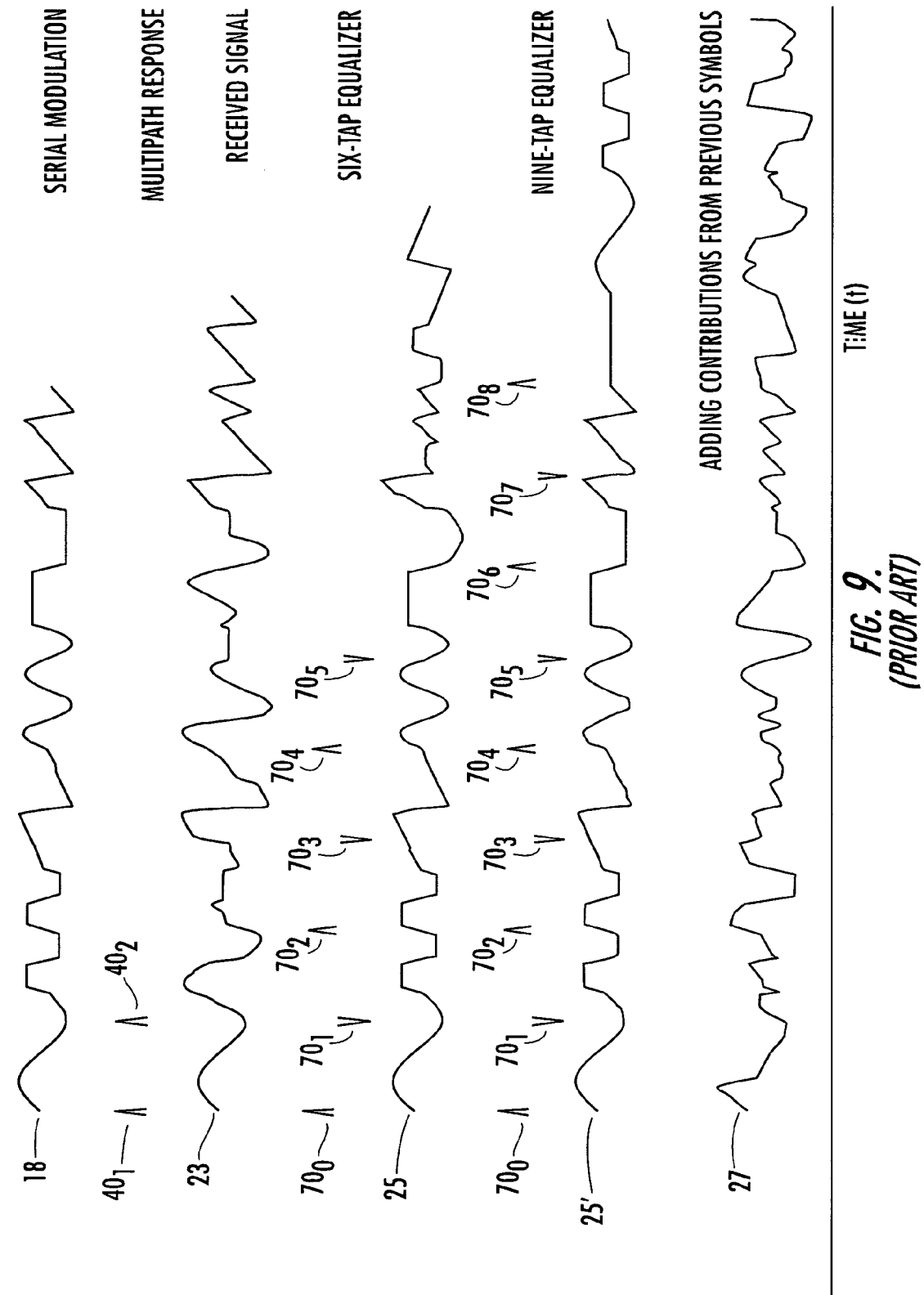
FIG. 9 is an illustration of the failure of conventional equalization when a received signal impaired by a severe two-signal multipath model is applied thereto in accordance with the prior art.
Figure 10:
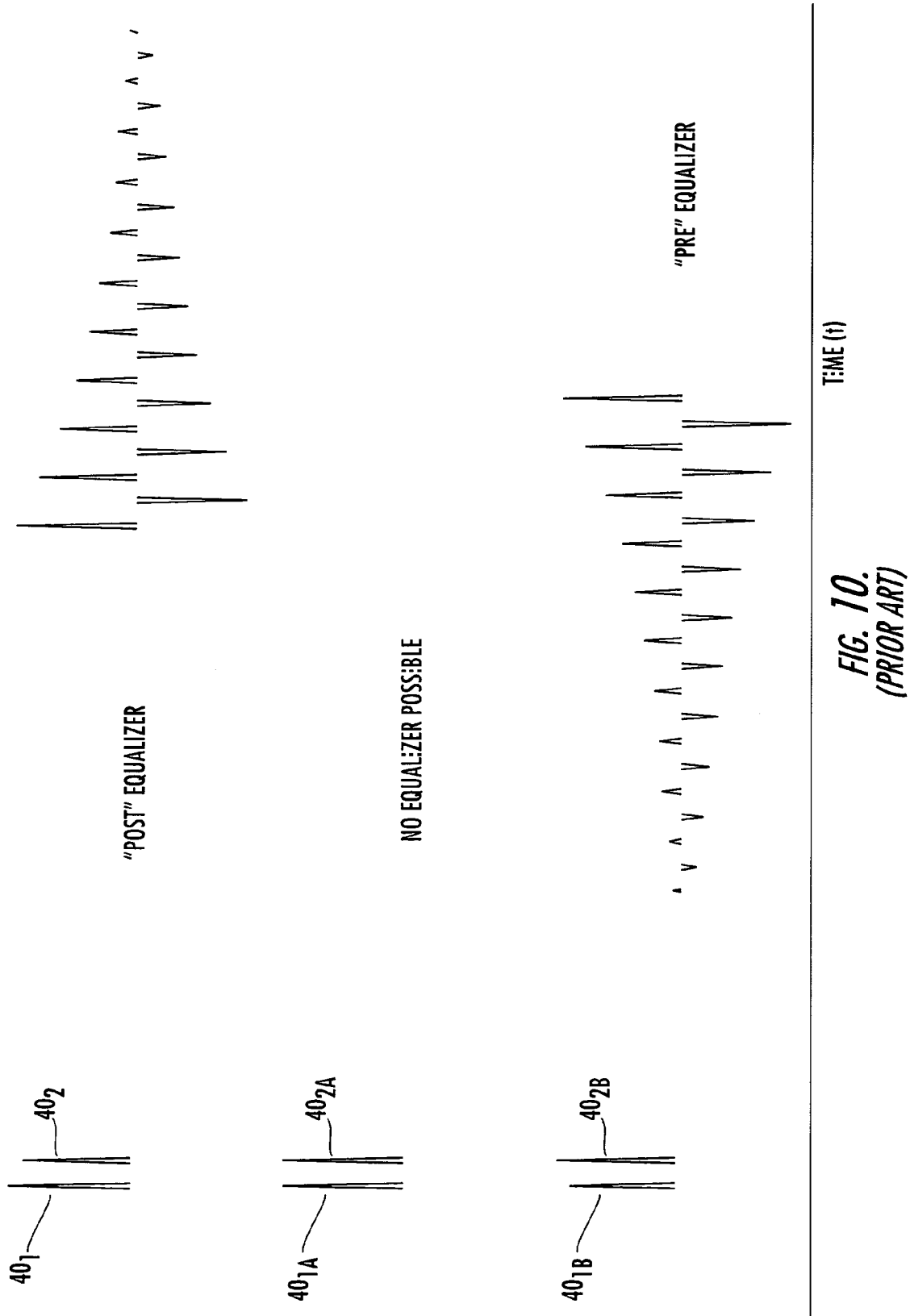
FIG. 10 is an illustration on the 0 dB echo problem, both static and dynamic, to conventional equalizers in accordance with the prior art.
Figure 11:
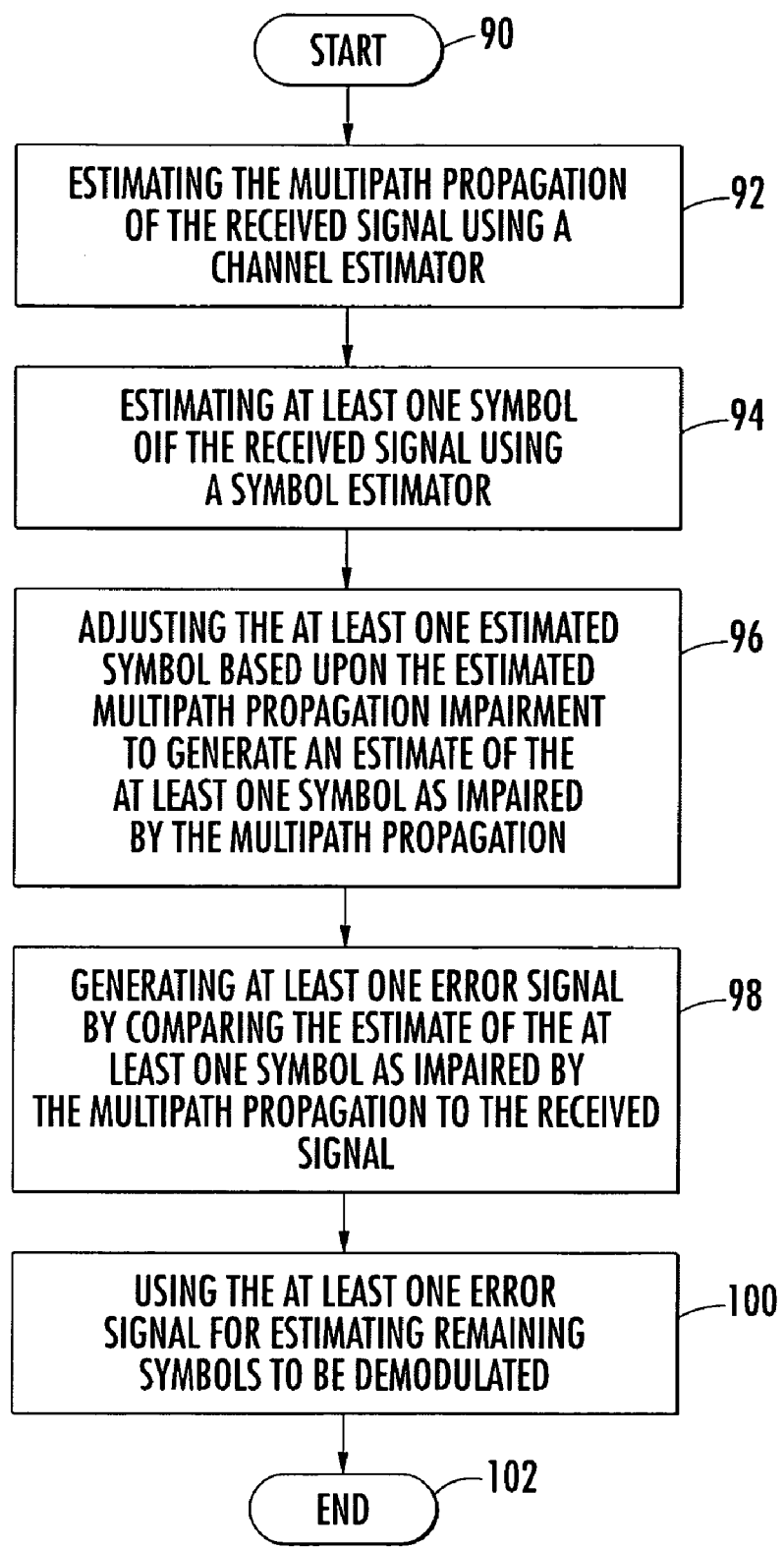
FIG. 11 is a flow diagram for demodulating a received digitally modulated signal in accordance with the present invention.

Unfortunately, equalization may not be sufficient when the echo is almost as strong as the direct path signal. Referring now to FIGS. 9 and 10, the two-signal $40_1$ and $40_2$ multipath scenario will be addressed again, except this time multipath signal component $40_2$ is almost as strong as the direct signal component $40_1$. Each signal component $40_1$ and $40_2$ corresponds to one of two propagation paths.

With a six-tap $70_{0-5}$ equalizer, the resulting signal 25 has the multipath propagation impairment cancelled at the echo and out to four compound echoes. However, there is a great deal of residual noise, not evident on the left, where cancellation is illustrated, but on the right, where the compound echoes go uncancelled. This example is carried out to a nine-tap $70_{0-8}$ equalizer which passes the received signal 23 (first tap $70_0$), cancels the channel echo (second tap $70_1$) and cancels seven subsequent compound echoes $70_{2-8}$, out to 8 times the original path delay, as indicated by signal 25'.

The result again shows cancellation on the left, but there is still significant noise remaining, as indicated on the right. However, a more realistic picture of what is happening is made available when one adds the effect of the multipath and the equalizer on the symbols arriving before the six $18_1$-$18_6$ that are illustrated in the digital serial modulated waveform 18. The resulting signal 27 is as bad as, if not worse, than the original received waveform 23.

The equalization process has another problem with respect to the 0-dB echo, as illustrated with reference to FIG. 10. Considering the multipath profile where two signal components $40_1$ and $40_2$ are very close in amplitude, with the first signal component $40_1$ dominating. The necessary equalizer response would be a "post" equalizer, which cancels the second component $40_2$ with respect to the first component $40_1$.

Suppose now that the multipath response were to change, and the second signal component $40_{2B}$ began instead to dominate the first signal component $40_{1B}$. This is because the first signal component suffered attenuation, or because the first signal was blocked and both paths represent reflections. In this case, the multipath cancellation requires a "pre" equalizer filter, cancelling the first signal component $40_1$ to arrive with respect to the second signal component $40_2$.

As discussed in the background section, these equalizers are long, much longer than their corresponding path delays. This characteristic makes them difficult to implement. As a practical matter, each additional required equalizer tap introduces additional noise into the system. The more taps, the more difficult it is to demodulate, even when the equalizer can implement all the taps. The discontinuity from the "post" equalizer to the "pre" equalizer represents a very difficult equalizer training problem. When the multipath response has two equal signal components $40_{1A}$ and $40_{2A}$, equalization can not be used.

The present invention will now be described with reference to FIGS. 11-20. Referring to the flow chart illustrated in FIG. 11, from the start (Block 90) the method for demodulating a received digitally modulated signal that is subjected to multipath propagation impairment comprises estimating the multipath propagation impairment of the received digitally modulated-signal using a channel estimator at Block 92, and estimating at least one symbol of the received digitally modulated signal using a symbol estimator Block 94.

The method further includes adjusting the at least one estimated symbol based upon the estimated multipath propagation impairment to generate an estimate of the at least one symbol as impaired by the multipath propagation Block 96, and at least one error signal is generated by comparing the estimate of the at least one symbol as impaired by the multipath propagation to the received digitally modulated signal at Block 98. In other words, the initial symbol sequence estimate is convolved with the multipath estimate, and the result of the convolution is subtracted from the received signal to generate the at least one error signal. The at least one error signal is then preferably used for estimating remaining symbols to be demodulated at Block 100, and the method may be stopped at Block 102.

The method according to this embodiment of the present invention advantageously combines channel estimation and symbol estimation for demodulating the received digitally modulated signal, which may be serial. This avoids the limitations inherently associated with inverse equalization and MLSE detection as discussed above. The method may be used to successfully demodulate in the presence of all the multipath profiles that can be corrected with an equalizer. In addition, the received signal may also be successfully demodulated in the presence of all the multipath profiles that can not be corrected with an equalizer without requiring extremely long processing for multiple compound delays, or without requiring special processing to accommodate discontinuities as required by the equalizer. In other words, "killer" equalizer tracking problems are avoided with the method according to the present invention. There is also an increased signal-to-noise ratio advantage in the present invention due to a reduction of required taps.

The present invention thus overcomes the dilemma of implementing a possibly non-existent inverse-channel response and reduces the resolution required of the associated processing with respect to that required of comparable channel-inverse equalization techniques.

Figure 12:
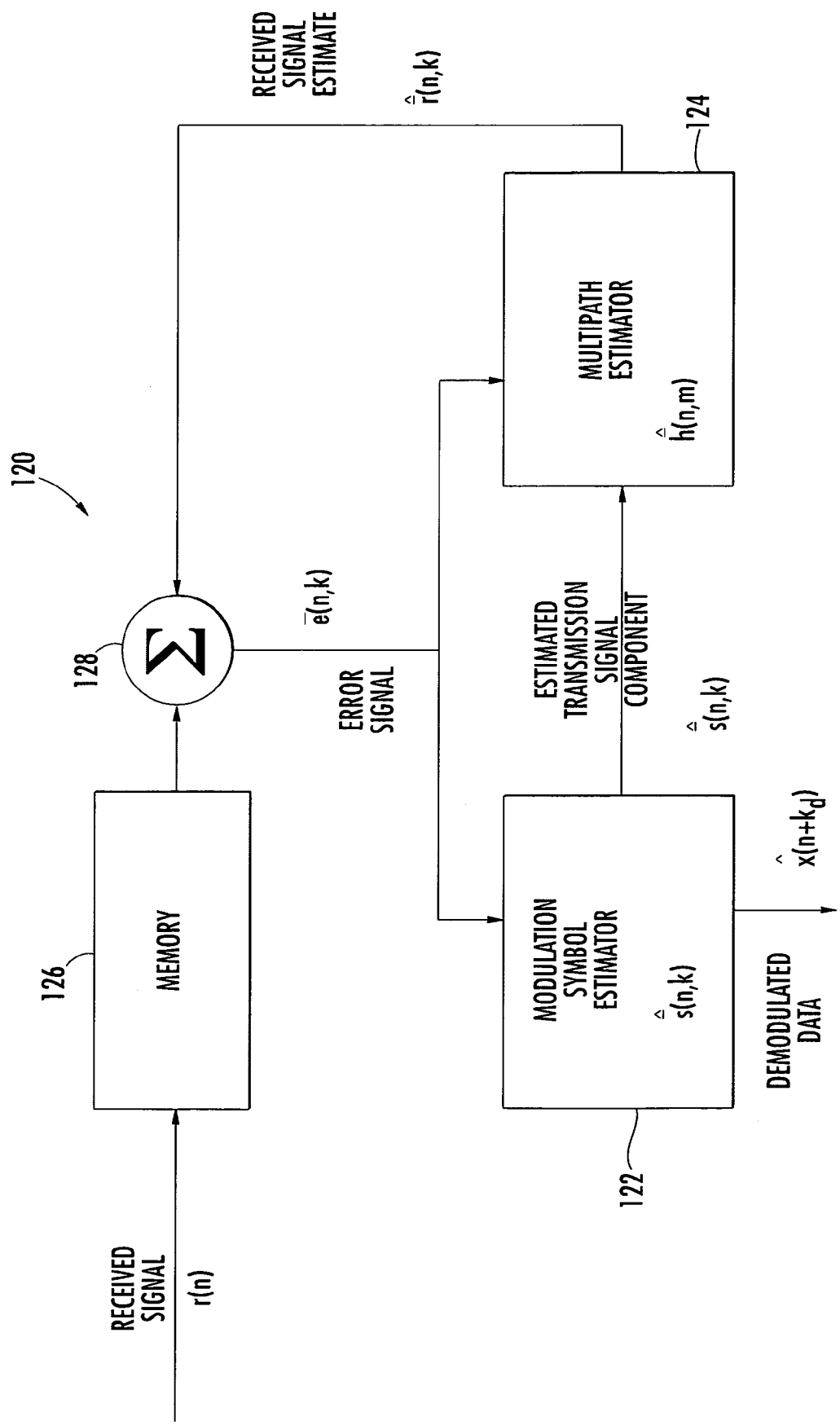
FIG. 12 is a simplified block diagram of a digital receiver illustrating the cooperation between symbol estimation and channel estimation in accordance with the present invention.

Referring now to the digital receiver 120 illustrated in FIG. 12, the two parts include symbol estimation using a symbol estimator 122 and multipath estimation using a channel estimator 124. Initial multipath estimation may be as straightforward as correlating against a reference sequence like an a-priori PN sequence, as readily understood by one skilled in the art, whereas symbol estimation can be as straight-forward as linear combination or demodulation of the error vector, as also readily understood by one skilled in the art.

Cooperative channel estimating demodulation will first be discussed. The serial modulated waveform 18 used in previous examples will again be the center point of the discussion. In addition, the five-path multipath profile $40_{1-5}$ shown earlier will also be the center point of the discussion.

The received signal 19 is stored in a memory 126. Suppose one could determine or at least estimate what the multipath profile looked like $130_{1-5}$ by estimating the relative delay, amplitude and phase of every path. Suppose also that one could search for or recognize the first symbol $18_1$ in the received waveform 19.

Figure 13:
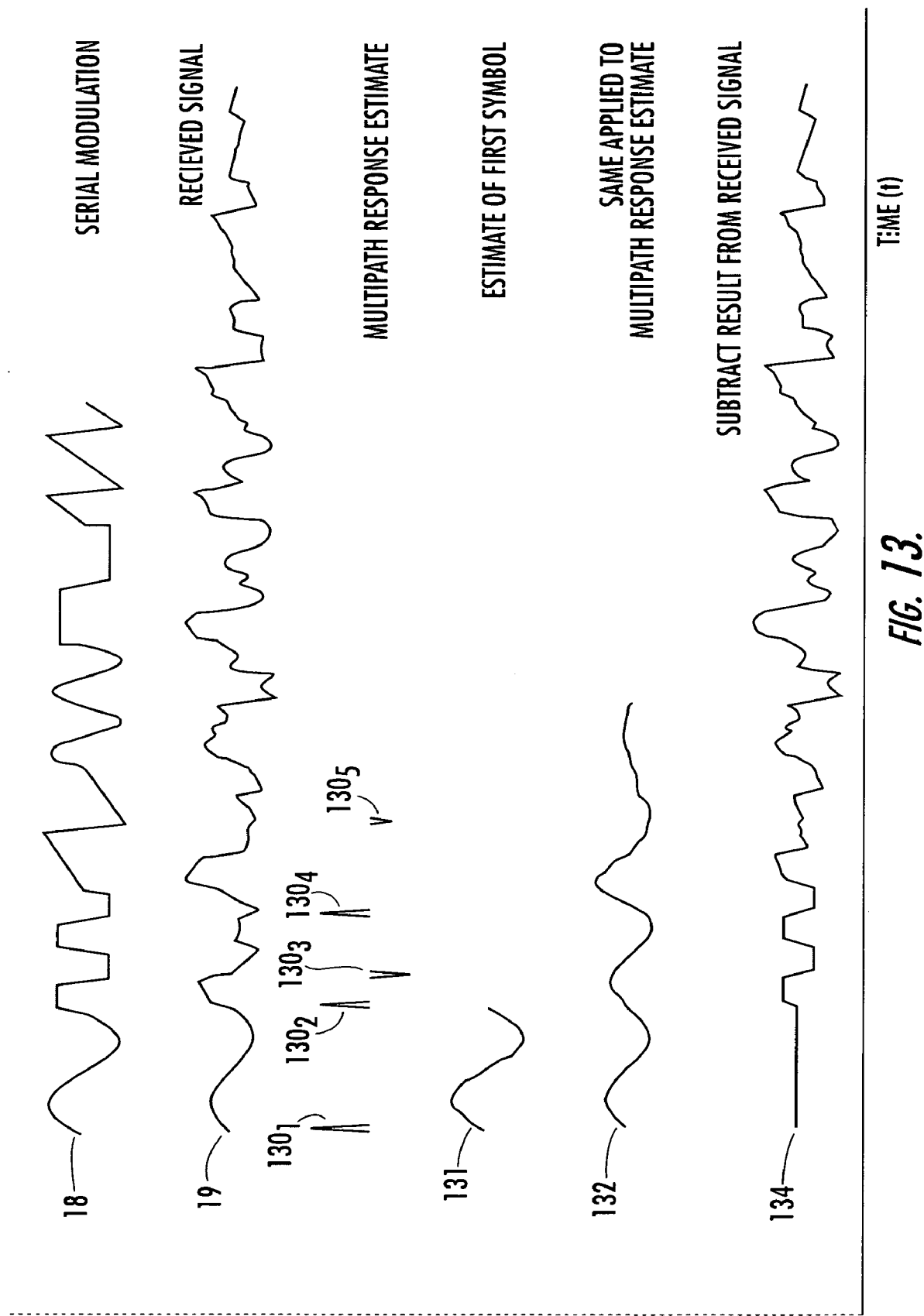
FIGS. 13-16 are illustrations of demodulation of the first six symbols of a received signal impaired by multipath propagation, with the demodulation based upon linear estimation in accordance with the present invention.

Then, knowing the multipath profile $130_{1-5}$ or at least having a good appreciation as indicated by signal 132, one could assess the effects of this multipath profile on the first symbol 131, as illustrated in FIG. 13. By subtracting this multipath-corrupted first symbol $18_1$ from the received waveform 19 using a summing network 128, one gets an error signal 134.

In actuality, the first symbol $18_1$ was recognized above by choosing the symbol 131 which minimized this error waveform 134. We continue to demodulate this same serial modulated waveform 18. We already know the first symbol $18_1$, and we are working off of the error signal 134 derived from the previous step, and we have a good estimate of the multipath response $130_{1-5}$.

In fact, we use the first symbol $18_1$ to refine our good estimate of the multipath response and make it better. The next step is to estimate the second symbol 137 again by driving the estimation process, which causes convergence of the error signal 134 to a set level, such as zero.

Figure 14:
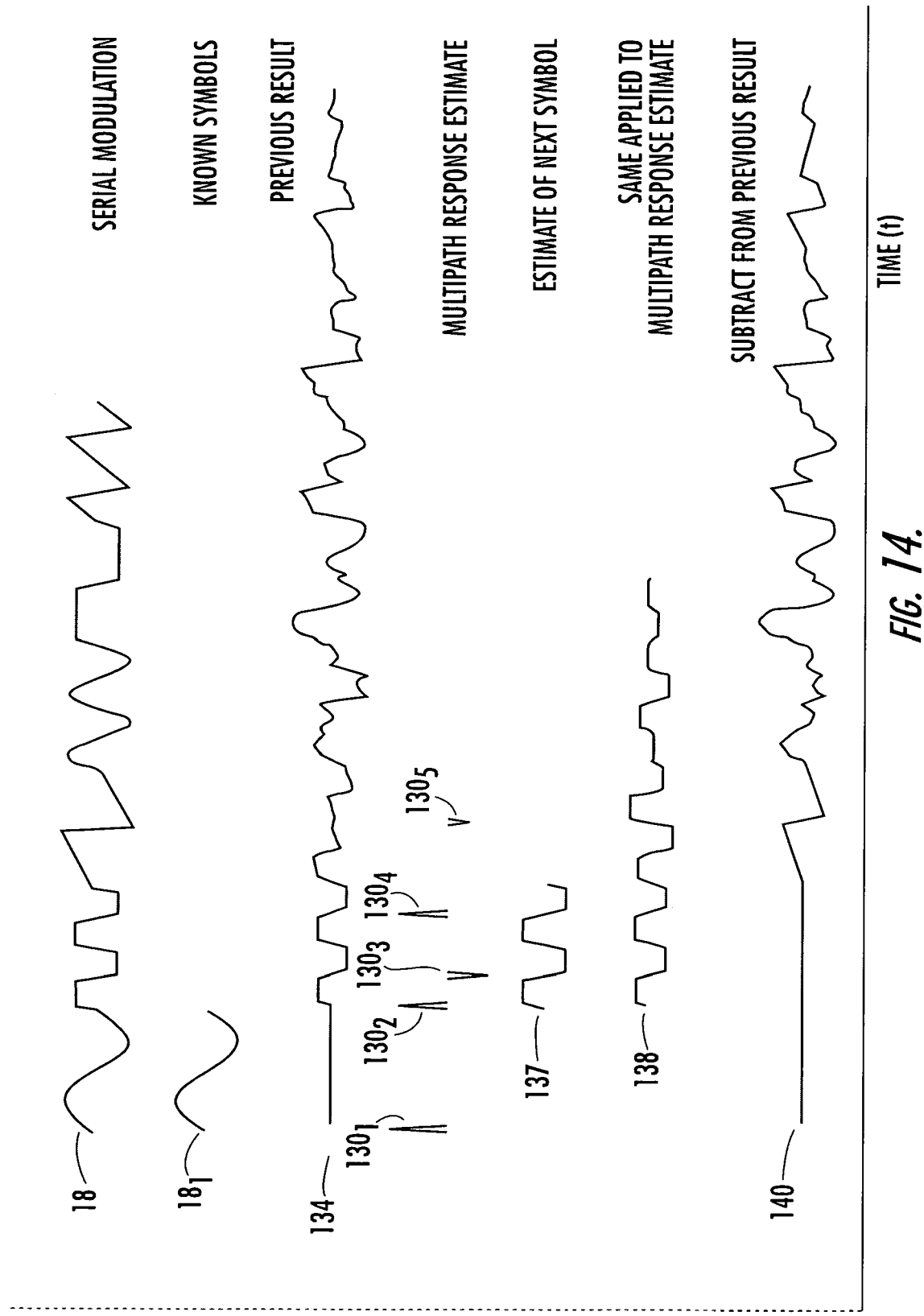

Application (e.g., convolution) to the multipath estimate yields an estimate 138 of the component of the received waveform which corresponds to the second symbol $18_2$. Subtraction yields a new error signal 140, which is closer to flatline than the previous error signal 134, as illustrated in FIG. 14. This means we are making progress and that we are heading in the right direction.

Figure 15:
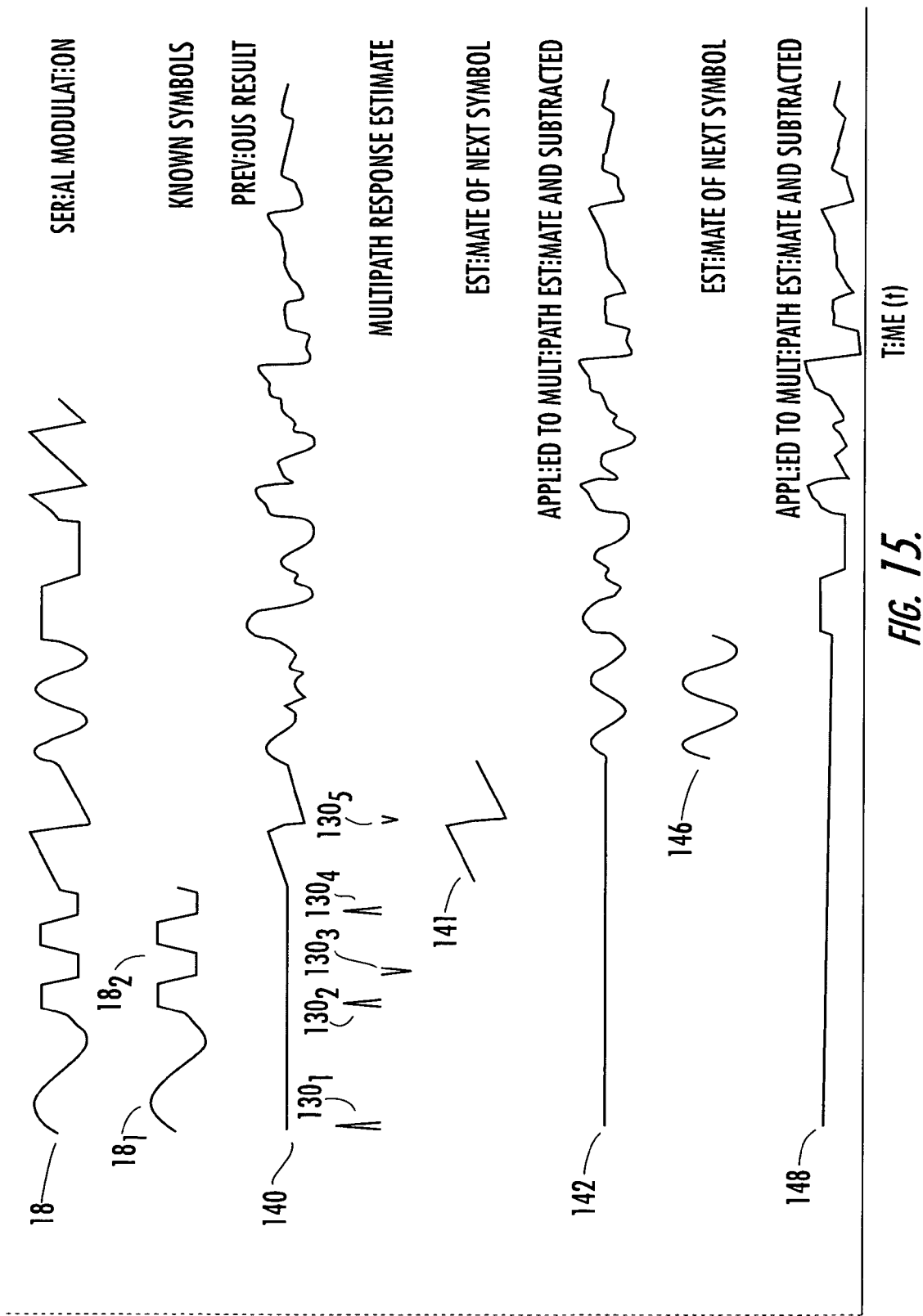

Referring to FIG. 15, the same transmitted serial modulation waveform 18 is offered as a reference. We already know the first two symbols $18_1$ and $18_2$, and we are working off of the new error signal 140 from the previous step. We have a good estimate of the multipath response $130_{1-5}$, which is again refined with the benefit of the error signal 140 based upon the previously demodulated symbol.

The next step is to estimate the third symbol 141, again by driving the error signal 140 to zero. The resulting error signal 142 is shown next, which incorporates the effects of multipath, as estimated, on the demodulated third symbol $18_3$. After using the third symbol $18_3$ and the new error signal 142 to again update the multipath estimate $130_{1-5}$, the fourth symbol 146 is estimated. A new error signal 148 is generated.

Again, the same transmitted serial modulation waveform 18 is offered as a reference. We already know the first four symbols $18_1$-$18_4$ from earlier in the process. We are working off of the new error signal 148 from the previous step. Again, we have a good estimate of the multipath response $130_{1-5}$, again refined using the new error signal 148 and the fourth symbol $18_4$, just demodulated.

The next step is to estimate the fifth symbol 149, again by driving the error signal 148 to zero. The resulting error signal 150 is shown next, which again incorporates the effects of multipath, as estimated, on this newest demodulated symbol. After using the fifth symbol $18_5$ and the new error signal 150 to again update the multipath estimate, the last symbol 152 is estimated, and a new error signal 154 is generated.

Figure 16:
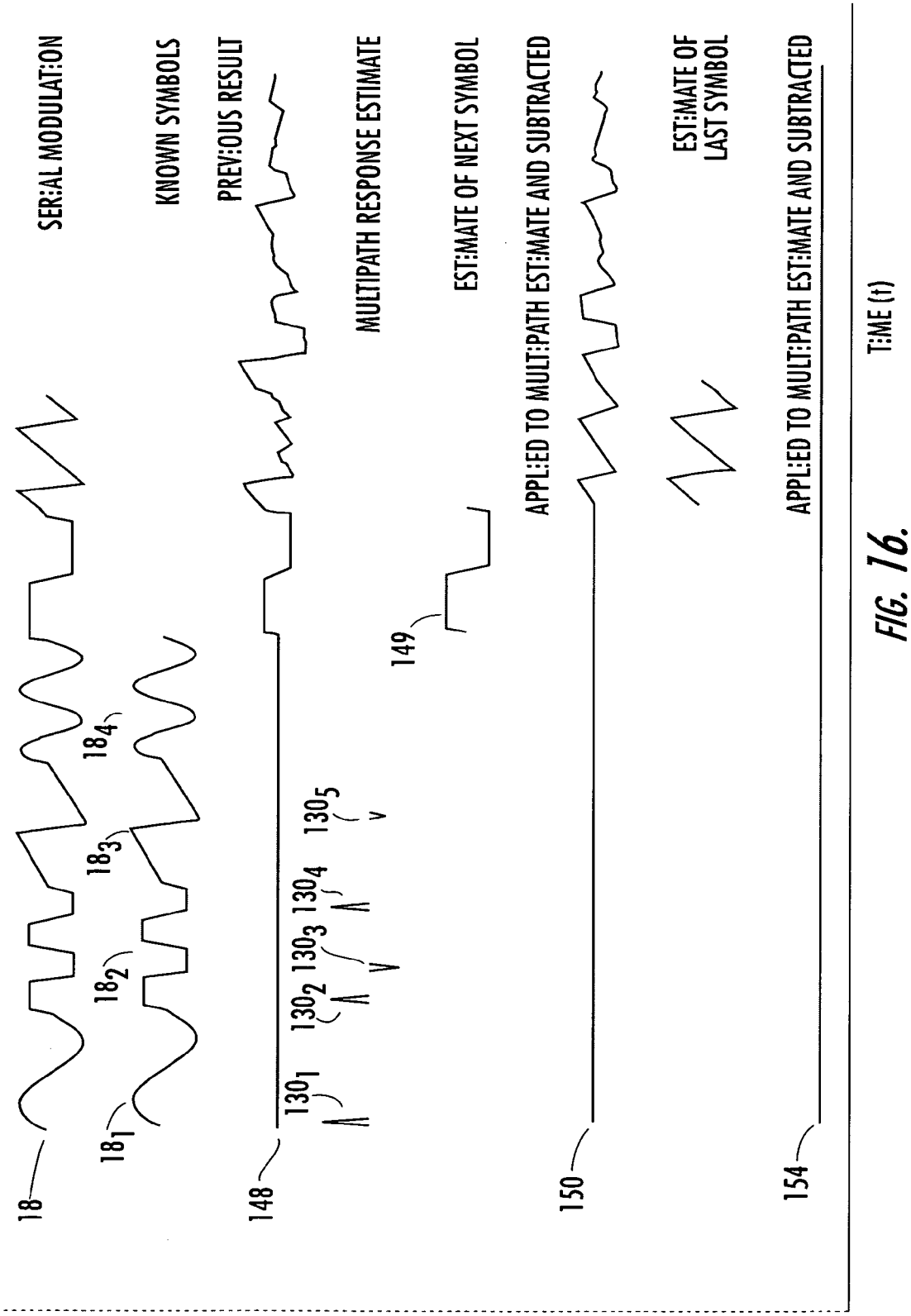
Figure 17:
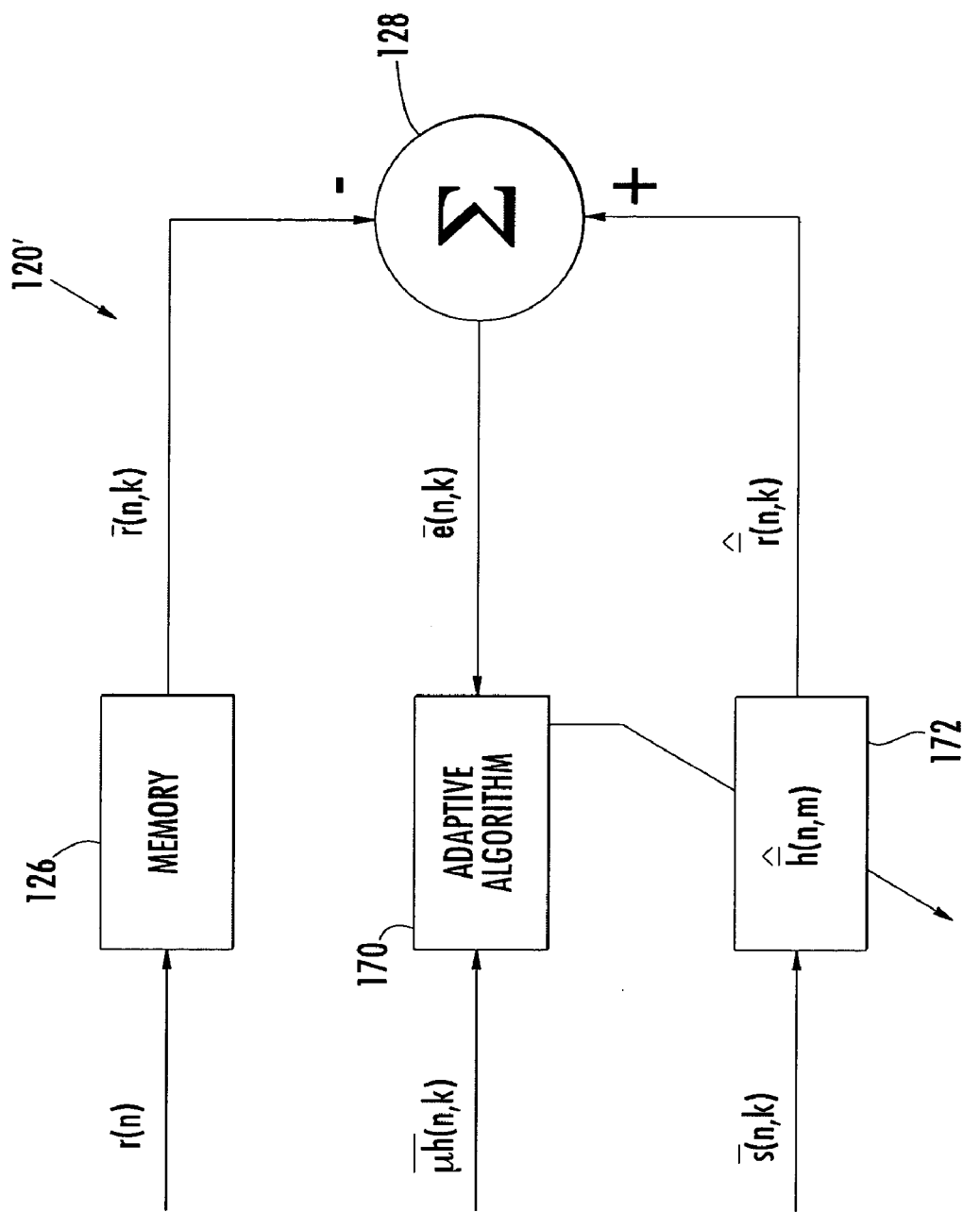
FIG. 17 is a block diagram of a digital receiver having adaptive channel estimation in accordance with the present invention.
Figure 18:
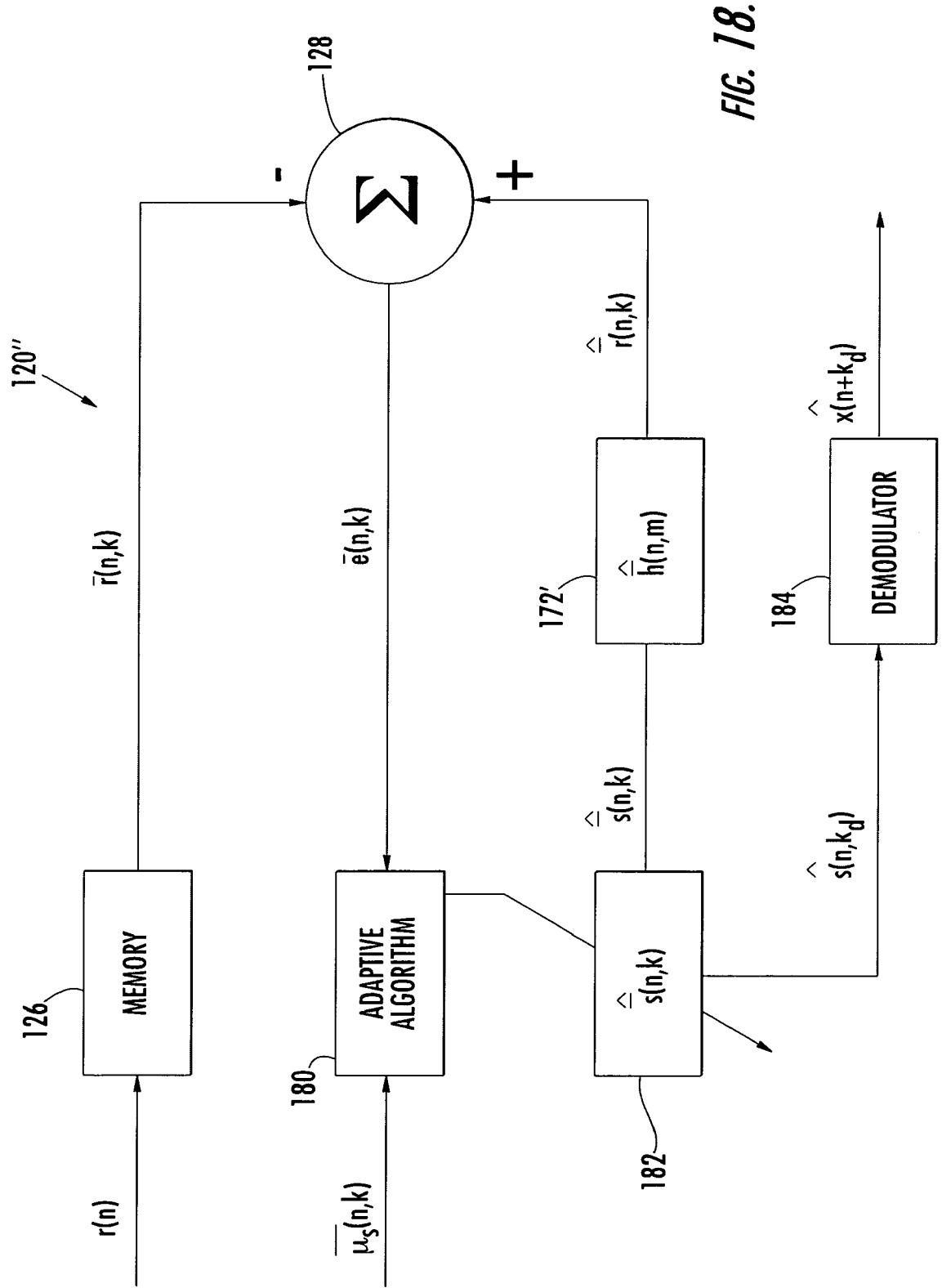
FIG. 18 is a block diagram of a digital receiver having adaptive symbol estimation in accordance with the present invention.

The flatline of error signal 154 indicates successful demodulation, as illustrated in FIG. 16. Any deviation at this point from zero would be due to one or more of the following causes. Noise in the received signal; errors in the multipath estimate, which is normal in noisy channels but limited with respect to equalizer tap noise due to the absence of compound equalizer echos; and demodulation errors, which are expected when operating near the SNR threshold which is much lower than that experienced by equalizer-based systems in severe multipath environments. Any error left can be used to drive an adaptive multipath or channel estimation.

In another embodiment of the digital receiver, adaptive algorithms are applied to both processes, i.e., channel estimation and symbol estimation. The first part of this method is an adaptive channel estimation process illustrated in FIG. 17. In this digital receiver 120', the received signal waveform r(n) is stored in the memory 126 as a received signal vector $\bar{r}(n,k)$ whose depth is represented by index k. An adaptive algorithm 170 may be part of the channel estimator 172. It is assumed that the transmission modulation waveform s(n) is known and stored as a vector $\bar{s}(n,k)$ also indexed in depth by sample index k. The following convention applies to each element of the transmission modulation-waveform vector $\bar{s}(n,k)$:

$$s(n,k)=s(n+k)$$

This same convention applies to all vector variables using (n,k) arguments throughout this document. The vector modulation waveform $\bar{s}(n,k)$ is applied to an estimate $\hat{\bar{h}}(n,m)$ of the transmission-channel sampled-time response $\bar{h}(n,m)$. For purposes of initialization, the transmission-channel sampled-time response-estimate $\hat{\bar{h}}(n,m)$ may be initialized, at the beginning of the process, to unity-gain at m=0 and zero response at all other values of m.

When the vector modulation waveform $\bar{s}(n,k)$ is applied to the channel-response estimate $\hat{\bar{h}}(n,m)$, the result is an estimate vector $\hat{\bar{r}}(n,k)$ of the corresponding received waveform vector $\bar{r}(n,k)$. These two vectors are subtracted in the summing network 128, resulting in the error signal vector $\bar{e}(n,k)=\hat{\bar{r}}(n,k)-\bar{r}(n,k)$. This error signal drives the adaptation process 170, which modifies the channel-response estimate $\hat{\bar{h}}(n,m)$ in the channel estimator 172 in such a manner as to cause the error vector $\bar{e}(n,k)$ to converge on the corresponding zero vector.

Any number of adaptive algorithms may be used to gradually modify the channel response vector estimate $\hat{\bar{h}}(n,m)$ towards a successively more accurate representation of the channel response vector $\bar{h}(n,m)$. The LMS algorithm is known for its advantages in tracking non-stationary processes and is used, for that reason, as an example. The LMS algorithm requires a convergence coefficient µ. In this case, the convergence coefficient is defined at every time-sample point n over the vector depth index k. The vector convergence coefficient is denoted $\bar{\mu}_h(n,k)$. An LMS adaptation recursion equation suitable for adaptation at every time sample n is $$\hat{h}(n+1, m) = \hat{h}(n, m) - \sum_{k=k_{min}+m_{max}}^{k_{max}+m_{min}} \mu_h(n, k-m)e(n, k)s(n, k-m)$$

An advantageous feature of the present invention is contained in the second part of this method, which is the progressive adaptive estimation of the transmission modulation waveform s(n). An adaptive algorithm 180 may be part of the symbol estimator 172. As best illustrated by the digital receiver 120'' in FIG. 17, an adaptive process 180 is used to converge on the most likely modulation waveform when the channel response approximation vector $\bar{h}(n,m)$ in the channel estimator 172' is sufficiently known to be a sufficiently valid approximation of the channel response vector $\bar{h}(n,m)$.

In this digital receiver 120'', the received signal waveform r(n) is again stored in the memory 126 as a received signal vector $\bar{r}(n,k)$, whose depth is represented by index k. It is assumed that the channel response vector $\bar{h}(n,m)$ is sufficiently known and stored as a vector $\bar{h}(n,m)$ also indexed in depth by sample index k. An estimate $\bar{\hat{s}}(n,k)$ of the vector modulation waveform $\bar{s}(n,k)$ is applied to the stored channel time-response vector-estimate $\bar{h}(n,m)$. For purposes of initialization, the estimate $\bar{\hat{s}}(n,k)$ of the transmitted modulation waveform may be initialized, at the beginning of the process, to all zeroes.

When the vector modulation-waveform approximation $\bar{\hat{s}}(n,k)$ is applied to the channel-response estimate $\bar{h}(n,m)$, the result is an estimate vector $\hat{\bar{r}}(n,k)$ of the corresponding received waveform vector $\bar{r}(n,k)$. These two vectors are subtracted in the summing network 128, resulting in the an error signal vector $$\bar{e}(n, k) = \hat{\bar{r}}(n, k) - \bar{r}(n, k).$$

This error signal drives the adaptation process, which modifies the estimate $\bar{\hat{s}}(n,k)$ of the vector modulation waveform $\bar{s}(n,k)$ in such a manner as to cause the error vector $\bar{e}(n,k)$ to converge on the corresponding zero vector.

Again, any number of adaptive algorithms may be used to gradually modify vector modulation waveform approximation vector $\bar{\hat{s}}(n,k)$ towards a successively more accurate reproduction of the transmitted modulation waveform vector $\bar{s}(n,k)$. Again, the LMS algorithm is known for its advantages in tracking non-stationary processes and is used, for that reason, as an example. The LMS algorithm requires a convergence coefficient µ. In this case, the convergence coefficient is defined at every time-sample point n over the vector depth index k. The vector convergence coefficient is denoted $\bar{\mu}_s(n,k)$. An LMS adaptation recursion equation suitable for adaptation at every time sample n is $$\hat{s}(n+1, k-1) = \hat{s}(n, k) - \sum_{m=m_{\min}}^{m_{\max}} \mu_s(n, k) e(n, k-m) \hat{h}(n, m)$$

The process is completed through the selection of a suitable delay index $k_d$ from which to generate a modulation waveform estimate $\hat{s}(n+k_d)$ suitable for demodulation through demodulator 184. This demodulation process yields an estimate $\hat{x}(n+k_d)$ of the original corresponding data sequence element $x(n+k_d)$.

What has just been described is a method of adaptively converging on an estimate $\hat{s}(n)$ of the modulation waveform $s(n)$. However, many serial data-modulation processes are linear. In each of these cases, an appropriate substitution of variables serves to convert this method into an equivalent form where adaptation is applied directly to an estimate $\hat{x}(n)$ of the modulation data-sequence $x(n)$.

An example of such a system where this is possible is the 8-VSB modulation applicable to the ATSC standard for terrestrial television broadcast. Such direct estimation of the modulation data-sequence results in a significant advantage in computational efficiency. Such direct estimation of the modulation data-sequence through the substitution described is also relevant and applicable to the remainder of this disclosure.

Further savings in computational efficiency may be realized by considering the restrictions on modulation symbol-states associated with a modulation data-sequence $x(n)$ specific to a given modulation system in question. Again, referring to the 8-VSB ATSC DTV example, the modulation data-sequence in this case is limited to 8 states (four positive states and four negative states, namely: −7, −5, −3, −1, 1, 3, 5 and 7).

An improvement in bit-error-rate (BER) performance is achievable as follows. In many modulation systems, linear modulation applies and forward error correction is employed, whether by trellis coded modulation, other convolutional coding or by block coding. In these cases, features of decision-feedback adaptation are introduced into the process by which the modulation waveform estimate (or the data sequence estimate) is caused to adaptively converge on the transmitted modulation waveform (or the original data sequence).

Specifically, Viterbi or other MLSE processes are applied to carefully selected elements of the modulation-waveform approximation vector $\bar{s}(n,k)$. As such, a more reliable estimate of the transmitted modulation waveform and of the original data sequence is generated. Correspondingly, adaptation time is reduced. In many cases, complexity is reduced in the process of reducing the number of required adaptation iterations.

Figure 19:
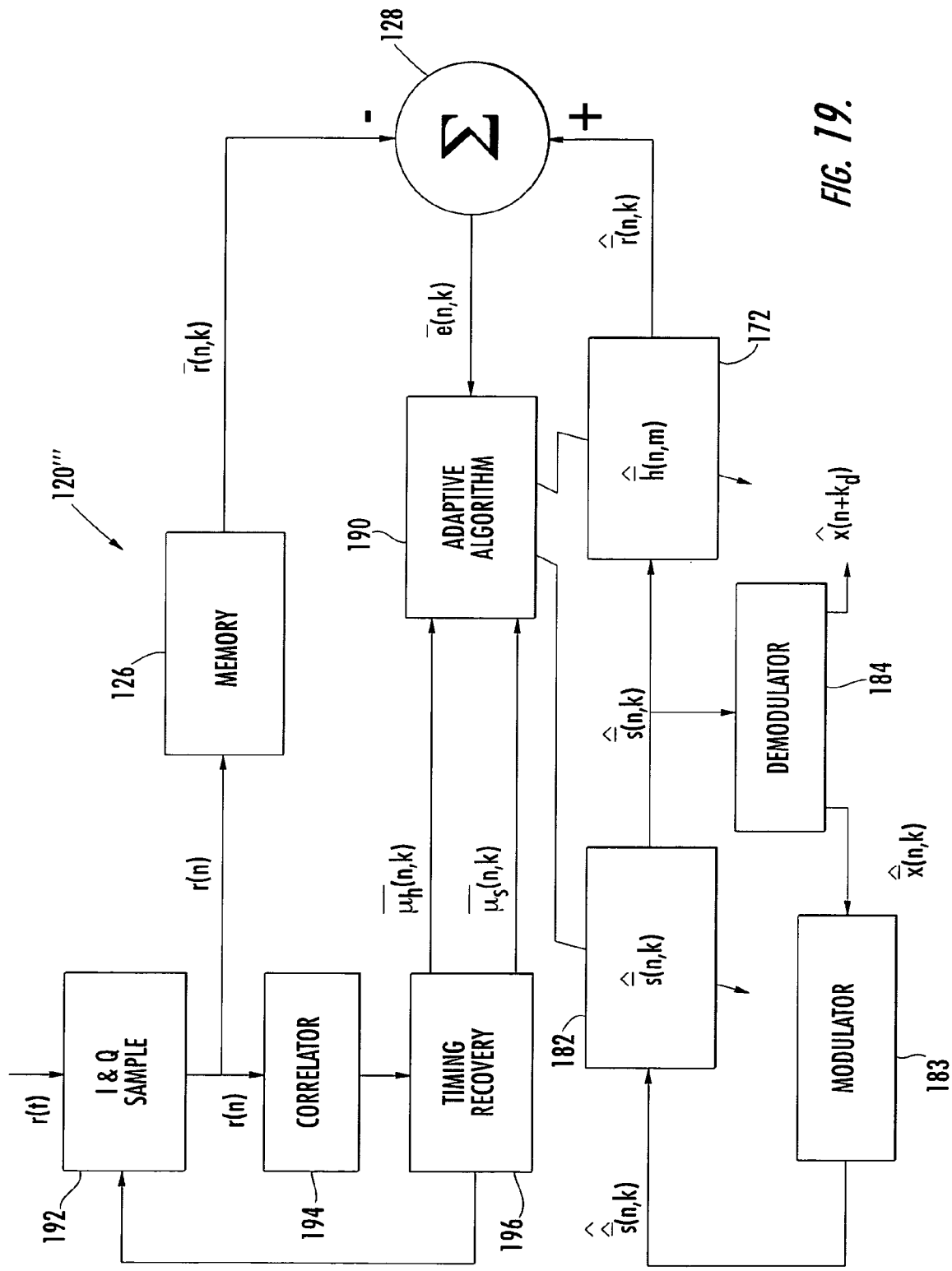
FIG. 19 is a block diagram illustrating a digital receiver having joint adaptive channel estimation and symbol estimation in accordance with the present invention.

The two components of this method described above and respectively illustrated in FIGS. 17 and 18 may also be combined into a signal digital receiver 120'''. Referring now to FIG. 19, this aspect of the present invention includes provisions for I&Q (I and Q sampler 192, i.e, for A/D conversion of the real and imaginary components of the RF waveform, as well as provisions for timing recovery 196. In this case, timing recovery may be based on correlation (via correlator 194) against an embedded reference waveform. Timing recovery is used to drive the I&Q sampling process as well as the timing of convergence coefficients $\bar{\mu}_h(n,k)$ and $\bar{\mu}_s(n,k)$ used in the adaptive algorithms 190, which may be included within the symbol estimator 182, or within the channel estimator 172. A modulator 183 and a demodulator 184 are also part of the digital receiver 120'''.

Figure 20:
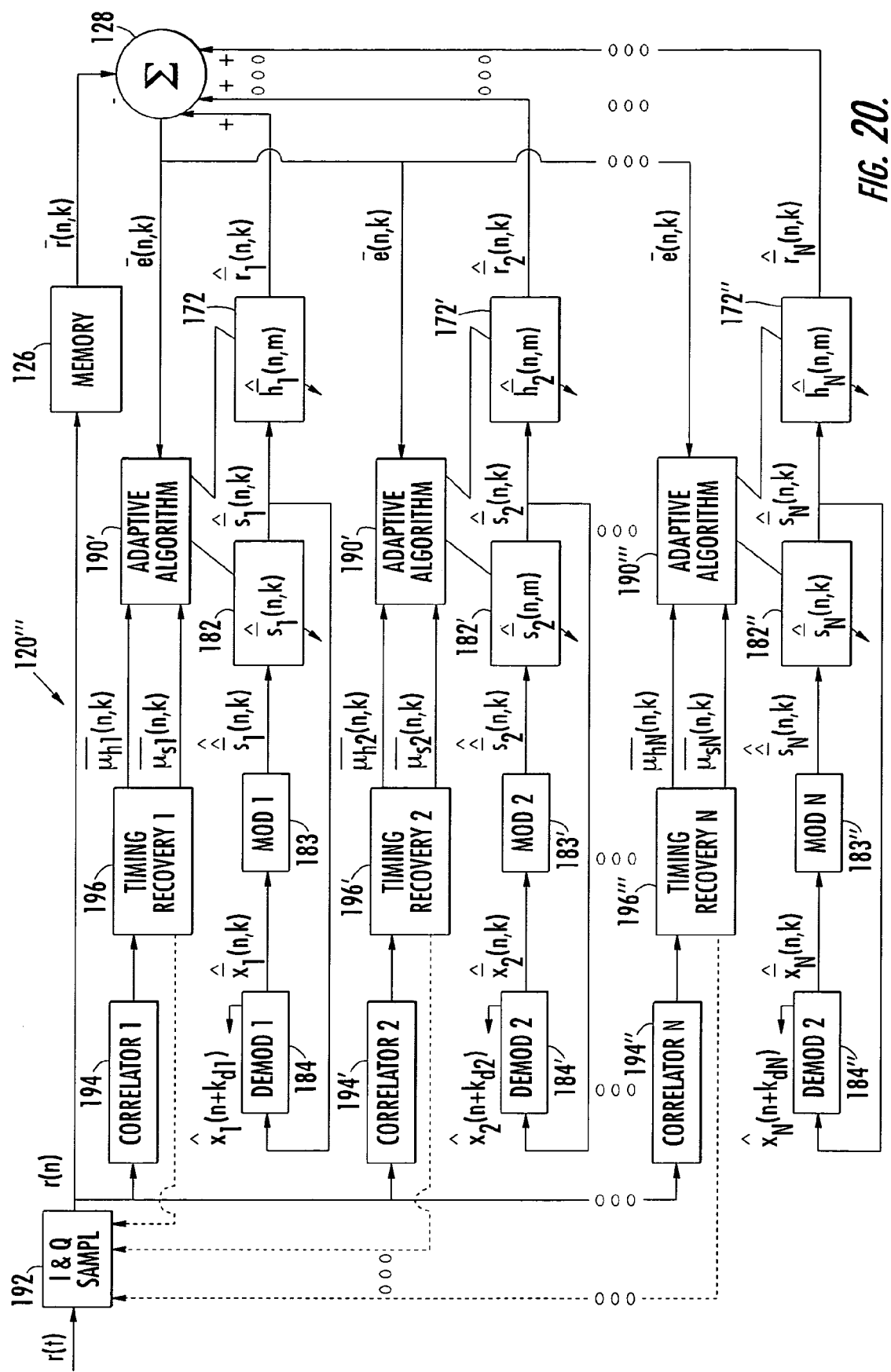
FIG. 20 is a detailed block diagram of a digital receiver having joint adaptive channel estimation and symbol estimation associated with a plurality of independent modulation sources in accordance with the present invention.

FIG. 20 illustrates another embodiment of the digital receiver 120'''' for simultaneously demodulating a plurality of received digitally modulated signals subjected to multipath propagation impairments.

The process of joint adaptation of the channel time-response approximation $\bar{h}(n,k)$ and of the transmitted modulation waveform approximations $\bar{s}(n,k)$ will now be discussed.

Various methods may be employed to realize practical joint adaptation. The first method of realizing practical joint adaptation involves the adaptation of the transmitted modulation-waveform vector approximation $\bar{s}(n,k)$ simultaneously with that of the vector channel time-response approximation $\bar{h}(n,k)$.

In a "blind" sense, $\bar{h}(n,k)$ may be initialized with a single unit amplitude sample surrounded by all zero amplitude samples. In a "trained" sense, the vector channel time-response approximation $\bar{h}(n,k)$ may be approximated through initial training based on a training waveform.

The second method of realizing practical joint adaptation comprises alternating adaptation of large segments with respect to depth index k. For example, the vector channel time-response approximation $\bar{h}(n,k)$ is first initialized with a received training waveform. This approximation is held constant while the transmitted modulation-waveform vector approximation $\bar{s}(n,k)$ is adaptively estimated over an appropriately sized segment of samples with respect to depth index k.

The size of this segment may be chosen appropriately with respect to minimum stationary intervals applicable to anticipated multipath. This transmitted modulation-waveform vector approximation $\bar{s}(n,k)$ is initialized in its adaptation process with the known training waveform. At the conclusion of the adaptive process used to converge on the transmitted modulation-waveform vector approximation $\bar{s}(n,k)$, the vector channel time-response approximation $\bar{h}(n,k)$ adaptation is resumed. The process continues back-and-forth between adaptive convergence of $\bar{s}(n,k)$ over some interval in domain k and subsequent vector channel time-response approximation $\bar{h}(n,k)$ adaptation.

A third method of realizing joint adaptation involves transformation of the modulation-waveform vector-approximation recursion-equations for $\bar{s}(n,k)$ into a single equation in one unknown variable. In other words, linear combination or estimation is being performed. Such an equation is formulated from the vector channel time-response approximation $\bar{h}(n,k)$. This equation is applied to known samples of $\bar{s}(n,k)$ to solve successively for unknown samples, one at a time. The approximation $\bar{h}(n,k)$ is updated either every time sample n or in appropriately sized segments.

A fourth method involves the use of an adaptation convergence coefficient $\mu_s(n,k)$ scaled in magnitude over depth index k for adaptive convergence of the modulation waveform approximation $\bar{s}(n,k)$.

All of these methods are subject to the caveats described above. These include operation in the data-sequence domain "$\bar{s}(n,k)$" as opposed to operation in the modulation-waveform domain "$\bar{s}(n,k)$". These caveats also include the introduction of "decision" activity in the approximation process in the interest of BER performance and in the interest of reduced system complexity.

There is a significant advantage associated when operating in the data-sequence domain $\bar{x}(n,k)$ as opposed to operating in the modulation-waveform domain $\bar{s}(n,k)$. This advantage is one of reduced complexity. This advantage is owed to the fact that, when operating in the data-sequence domain $\bar{x}(n,k)$, the recursion equations used for adaptation need only be exercised at the sample points at which data-sequence samples are present.

In summary, the use of joint modulation waveform (or data sequence) adaptation approximation and channel time-response adaptation approximation has several clear advantages over conventional equalization techniques. The method of adaptive convergence on channel time-response is advantageous over adaptive convergence on inverse-channel equalization response in that adaptation is limited in time to the duration of the channel time-response; a shorter convergence time is required as a consequence; required accuracy is limited to that of a fewer number of channel time-response taps as opposed to a greater number of equalizer taps otherwise necessary to accomplish substantial channel-inverse filtering; and channel estimation is always mathematically realizable as opposed to inverse-channel response estimation, which is sometimes not mathematically realizable in a practical FIR filter.

Similarly, the use of adaptive algorithms, such as LMS, to estimate transmitted modulation waveforms or original data sequences is superior to MLSE methods in the following respects: there is no requirement to maintain surviving trellis paths or to calculate associated metrics; complexity does not necessarily increase with multipath delay intervals; and complexity is reduced to manageable levels in extreme cases.

Additionally, the advantages of conventional methods are applicable to the method of joint adaptive approximation of modulation waveforms or data sequences and channel time-responses. These advantages include: the ability to exploit training (data) sequences or (modulation) waveforms for improved performance as is the case for "trained" equalization; ability to initialize from a "blind" start as is the case for "blind" equalization; the ability to improve performance through "decision" processes as is the case for "decision-feedback" equalization; and the ability to improve performance through decisions based on convolutional encoding as is the case for MLSE demodulation.

FIG. 20 illustrates the extension of joint channel and modulation waveform estimation to cases where at least two modulation waveforms applied to two distinct propagation channels are received jointly. In this case, the disclosed methods apply to the reception of each modulation waveform independently through each propagation channel. The recursion equations described above are applicable subject to appropriate sub-scripting with respect to index of modulation origin (1 through N).

The received modulation waveforms are jointly recoverable under the following conditions: independent training waveforms are employed at each modulator, $s_1(n)$ through $s_n(n)$, which have sufficiently favorable autocorrelation and cross-correlation properties (near-impulse autocorrelation and very low cross-correlation); and sufficient SNR is available.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A method for demodulating a received digitally modulated signal subjected to multipath propagation impairment, the method comprising:

estimating the multipath propagation impairment of the received digitally modulated signal during at least one interval of clear-channel reception;

estimating at least one symbol of the received digitally modulated signal;

adjusting the at least one estimated symbol based upon the estimated multipath propagation impairment to generate an estimate of the at least one symbol as impaired by the multipath propagation;

generating at least one error signal by comparing the estimate of the at least one symbol as impaired by the multipath propagation to the received digitally modulated signal; and using the at least one error signal for estimating remaining symbols to be demodulated.

2. A method according to claim 1, further comprising using the at least one error signal for refining the estimated multipath propagation impairment.

3. A method according to claim 2, further comprising:
estimating at least one next symbol; and
adjusting the estimate of the at least one next symbol based upon the refined estimated multipath propagation impairment for generating an estimate of the at least one next symbol as impaired by the multipath propagation.

4. A method according to claim 3, further comprising refining the at least one error signal by comparing the estimate of the at least one next symbol as impaired by the multipath propagation to the received digitally modulated signal.

5. A method according to claim 4, wherein refining the at least one error signal further comprises comparing the estimate of the at least one next symbol as impaired by the multipath propagation to the at least one error signal resulting from at least one previous comparison.

6. A method according to claim 1, wherein estimating the multipath propagation impairment and estimating the at least one symbol are based upon an adaptive algorithm.

7. A method according to claim 1, wherein estimating the multipath propagation impairment and estimating the at least one symbol are based upon a training waveform embedded in the received digitally modulated signal.

8. A method according to claim 1, wherein the received digitally modulated signal comprises at least one of a digital broadcast television signal, a digital broadcast radio signal, a digital cellular telephone signal, and a digital wireless local area network (LAN) signal.

9. A method for demodulating a received digitally modulated signal subjected to multipath propagation impairment, the method comprising:

estimating the multipath propagation impairment of the received digitally modulated signal during at least one interval of benign multipath propagation impairment;

estimating at least one symbol of the received digitally modulated signal;

adjusting the at least one estimated symbol based upon the estimated multipath propagation impairment to generate an estimate of the at least one symbol as impaired by the multipath propagation;

generating at least one error signal by comparing the estimate of the at least one symbol as impaired by the multipath propagation to the received digitally modulated signal; and using the at least one error signal for estimating remaining symbols to be demodulated.

10. A method according to claim 9, further comprising using the at least one error signal for refining the estimated multipath propagation impairment.

11. A method according to claim 10, further comprising:
   estimating at least one next symbol; and
   adjusting the estimate of the at least one next symbol based upon the refined estimated multipath propagation impairment for generating an estimate of the at least one next symbol as impaired by the multipath propagation.

12. A method according to claim 11, further comprising refining the at least one error signal by comparing the estimate of the at least one next symbol as impaired by the multipath propagation to the received digitally modulated signal.

13. A method according to claim 12, wherein refining the at least one error signal further comprises comparing the estimate of the at least one next symbol as impaired by the multipath propagation to the at least one error signal resulting from at least one previous comparison.

14. A method according to claim 9, wherein estimating the multipath propagation impairment and estimating the at least one symbol are based upon an adaptive algorithm.

15. A method according to claim 9, wherein estimating the multipath propagation impairment and estimating the at least one symbol are based upon a training waveform embedded-in the received digitally modulated signal.

16. A method according to claim 9, wherein the received digitally modulated signal comprises at least one of a digital broadcast television signal, a digital broadcast radio signal, a digital cellular telephone signal, and a digital wireless local area network (LAN) signal.

17. A digital receiver comprising:
   a channel estimator for estimating multipath propagation impairment of a received digitally modulated signal during at least one interval of clear-channel reception;
   a symbol estimator connected to said channel estimator for estimating at least one symbol of the received digitally modulated signal, said channel estimator adjusting the at least one estimated symbol based upon the estimated multipath propagation impairment to generate an estimate of the at least one symbol as impaired by the multipath propagation; and
   a summing network connected to said channel estimator and said symbol estimator for generating at least one error signal by comparing the estimate of the at least one symbol as impaired by the multipath propagation to the received digitally modulated signal;
   said symbol estimator using the at least one error signal for estimating remaining symbols to be demodulated.

18. A digital receiver according to claim 17, wherein said channel estimator uses the at least one error signal for refining the corresponding estimated multipath propagation impairment.

19. A digital receiver according to claim 18, wherein said symbol estimator estimates at least one next symbol, and adjusts the estimate of the at least one next symbol based upon the refined estimated multipath propagation impairment for generating an estimate of the at least one next symbol as impaired by the multipath propagation.

20. A digital receiver according to claim 19, wherein said summing network further refines the at least one error signal by comparing the estimate of the at least one next symbol as impaired by the multipath propagation to the received digitally modulated signal.

21. A digital receiver according to claim 20, wherein said summing network refines the at least one error signal by comparing the estimates of the at least one next symbol as impaired by the multipath propagation to the at least one error signal resulting from at least one previous comparison.

22. A digital receiver according to claim 17, wherein said channel estimator comprises an adaptive algorithm for estimating the multipath propagation impairment; and wherein said symbol estimator comprises an adaptive algorithm for estimating the at least one symbol.

23. A digital receiver according to claim 17, wherein said channel estimator estimates the multipath propagation impairment based upon a training waveform embedded in the received digitally modulated signal; and wherein said symbol estimator estimates the at least one symbol based upon a training waveform embedded in the received digitally modulated signal.

24. A digital receiver according to claim 17, wherein the received digitally modulated signal comprises at least one of a digital broadcast television signal, a digital broadcast radio signal, a digital cellular telephone signal, and a digital wireless local area network (LAN) signal.

25. A digital receiver comprising:
   a channel estimator for estimating multipath propagation impairment of a received digitally modulated signal during at least one interval of benign multipath propagation impairment;
   a symbol estimator connected to said channel estimator for estimating at least one symbol of the received digitally modulated signal, said channel estimator adjusting the at least one estimated symbol based upon the estimated multipath propagation impairment to generate an estimate of the at least one symbol as impaired by the multipath propagation; and
   a summing network connected to said channel estimator and said symbol estimator for generating at least one error signal by comparing the estimate of the at least one symbol as impaired by the multipath propagation to the received digitally modulated signal;
   said symbol estimator using the at least one error signal for estimating remaining symbols to be demodulated.

26. A digital receiver according to claim 25, wherein said channel estimator uses the at least one error signal for refining the corresponding estimated multipath propagation impairment.

27. A digital receiver according to claim 26, wherein said symbol estimator estimates at least one next symbol, and adjusts the estimate of the at least one next symbol based upon the refined estimated multipath propagation impairment for generating an estimate of the at least one next symbol as impaired by the multipath propagation.

28. A digital receiver according to claim 27, wherein said summing network further refines the at least one error signal by comparing the estimate of the at least one next symbol as impaired by the multipath propagation to the received digitally modulated signal.

29. A digital receiver according to claim 28, wherein said summing network refines the at least one error signal by comparing the estimates of the at least one next symbol as impaired by the multipath propagation to the at least one error signal resulting from at least one previous comparison.

30. A digital receiver according to claim 25, wherein said channel estimator comprises an adaptive algorithm for estimating the multipath propagation impairment; and wherein said symbol estimator comprises an adaptive algorithm for estimating the at least one symbol.

31. A digital receiver according to claim 25, wherein said channel estimator estimates the multipath propagation impairment based upon a training waveform embedded in the received digitally modulated signal; and wherein said symbol estimator estimates the at least one symbol based upon a training waveform embedded in the received digitally modulated signal.

32. A digital receiver according to claim 25, wherein the received digitally modulated signal comprises at least one of a digital broadcast television signal, a digital broadcast radio signal, a digital cellular telephone signal, and a digital wireless local area network (LAN) signal.

* * * * *

UNITED STATES PATENT AND TRADEMARK OFFICE
CERTIFICATE OF CORRECTION

PATENT NO. : 7,477,705 B2  Page 1 of 1
APPLICATION NO. : 11/253910
DATED : January 13, 2009
INVENTOR(S) : Vigil It is certified that error appears in the above-identified patent and that said Letters Patent is hereby corrected as shown below:

On the Title Page

Item [*] Notice:    Subject to any disclaimer, the term of this patent is extended or adjusted under 35 USC 154(b) by 234 days Delete the phrase "by 234 days" and insert -- by 320 days --

Signed and Sealed this

Fifteenth Day of June, 2010

David J. Kappos
*Director of the United States Patent and Trademark Office*